(12) United States Patent
Kobayashi et al.

(10) Patent No.: US 7,866,669 B2
(45) Date of Patent: Jan. 11, 2011

(54) COMPOSITE SEALING MATERIAL

(75) Inventors: Yukio Kobayashi, Gojo (JP); Akira Muramatsu, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 558 days.

(21) Appl. No.: 11/662,997

(22) PCT Filed: May 12, 2005

(86) PCT No.: PCT/JP2005/008729

§ 371 (c)(1),
(2), (4) Date: Mar. 15, 2007

(87) PCT Pub. No.: WO2006/030557

PCT Pub. Date: Mar. 23, 2006

(65) Prior Publication Data

US 2008/0018058 A1    Jan. 24, 2008

(30) Foreign Application Priority Data

Sep. 17, 2004  (JP) .............................. 2004-271703

(51) Int. Cl.
F16J 15/16 (2006.01)
F16J 15/32 (2006.01)
F16J 15/06 (2006.01)

(52) U.S. Cl. .................. 277/584; 277/611; 277/638

(58) Field of Classification Search .............. 277/584, 277/589, 611, 638
See application file for complete search history.

(56) References Cited

U.S. PATENT DOCUMENTS

| | | | | |
|---|---|---|---|---|
| 3,215,441 A * | 11/1965 | Horvereid | .................. | 277/437 |
| 3,394,941 A * | 7/1968 | Traub | .................. | 277/584 |
| 3,582,094 A * | 6/1971 | Whittaker | .................. | 277/584 |
| 3,848,880 A * | 11/1974 | Tanner | .................. | 277/584 |
| 4,268,045 A * | 5/1981 | Traub | .................. | 277/589 |
| 4,570,944 A * | 2/1986 | Traub | .................. | 277/572 |
| 4,893,823 A * | 1/1990 | Strouse et al. | .................. | 277/437 |
| 5,143,382 A * | 9/1992 | Maringer | .................. | 277/584 |
| 5,346,230 A * | 9/1994 | Schumacher et al. | ........ | 277/551 |
| 5,433,452 A * | 7/1995 | Edlund et al. | .................. | 277/589 |
| 7,140,618 B2 * | 11/2006 | Valls, Jr. | .................. | 277/609 |

FOREIGN PATENT DOCUMENTS

EP        1 087 157 A2     3/2001

(Continued)

OTHER PUBLICATIONS

Abstract, JP2003-028302, published Jan. 1, 2003, Inventor: Kuroki Yuichi, Applicant: NOK Corp., entitled "Sealing Device" (1 p.).

*Primary Examiner*—Vishal Patel
*Assistant Examiner*—Gilbert Y Lee
(74) *Attorney, Agent, or Firm*—The Webb Law Firm

(57) ABSTRACT

When the composite sealing material is press-fitted, the swelled portion of the first sealing portion of a first sealing member is press-fitted to impart sealing ability, the second extended portion of a second sealing member is pressed to the opening portion side of a sealing groove through the first extended portion of the first sealing member, and the upper surface of the second sealing portion is press-fitted to impart sealing ability.

12 Claims, 20 Drawing Sheets

FOREIGN PATENT DOCUMENTS

| | | |
|---|---|---|
| JP | 49-17868 | 2/1972 |
| JP | 63-203972 A | 8/1988 |
| JP | 8-193659 A | 7/1996 |
| JP | 11-2328 A | 1/1999 |
| JP | 11-201288 A | 7/1999 |
| JP | 2001-124213 A | 5/2001 |
| JP | 2002-156043 A | 5/2002 |
| JP | 2003-14126 A | 1/2003 |

\* cited by examiner

PRIOR ART

PRIOR ART

PRIOR ART

PRIOR ART

PRIOR ART

COMPOSITE SEALING MATERIAL

TECHNICAL FIELD

The present invention relates to a composite sealing material that can be used in a vacuum state or an ultra vacuum state, for instance, a composite sealing material that can be used for a semiconductor manufacturing apparatus such as a dry etching apparatus and a CVD apparatus.

BACKGROUND ART

Corresponding to a development of an electronics industry, the manufacturing technology of a semiconductor that can be a material of an electronic component such as an integrated circuit (IC) and a large scale integrated circuit (LSI) has been remarkably developed, in particular, corresponding to a high precision and thinning of a personal computer.

Consequently, the requirements to members to be used for a semiconductor manufacturing apparatus have been severe, and the kinds of the requirements have been increased.

For instance, it is necessary for a sealing material that is used for a semiconductor manufacturing apparatus such as a dry etching apparatus and a plasma CVD apparatus to have a vacuum seal performance as a basic performance. In addition, it is also necessary to perform such as a plasma resistance and a corrosive gas resistance depending on an installing position of an apparatus and a sealing material to be used.

Conventionally, a fluorocarbon rubber to which a fluid is hard to affect has been used for a sealing portion to which a plasma resistance and a corrosive gas resistance in addition to such a vacuum seal performance are required.

However, as an environment has been severe, for a fluorocarbon rubber, performances such as a plasma resistance and a corrosive gas resistance are insufficient, and sealing ability has been deteriorated. As a result, a new material has been required.

To such requirement, Patent document 1 (Japanese Laid-Open Patent Publication No. 1974-17868), Patent document 2 (Japanese Laid-Open Patent Publication No. 1999-2328), Patent document 3 (Japanese Laid-Open Patent Publication No. 1996-193659), and Patent document 4 (Japanese Laid-Open Patent Publication No. 2001-124213) propose a method of preventing a fluid having a corrosiveness by a resin or a metal while combining a rubber and a resin to maintain a seal performance by an elasticity of a rubber.

Patent document 1: Japanese Laid-Open Patent Publication No. 1974-17868
Patent document 2: Japanese Laid-Open Patent Publication No. 1999-2328
Patent document 3: Japanese Laid-Open Patent Publication No. 1996-193659
Patent document 4: Japanese Laid-Open Patent Publication No. 2001-124213

DISCLOSURE OF THE INVENTION

Problems to be Solved by the Invention

As shown in FIG. 16, a sealing member 100 described in Patent document 1 is configured by an O ring member 102 having a rubber elasticity and a peripheral ring member 104 having a cross section in an almost C shape that is made of an ethylene tetrafluoride resin or the like and that is installed on the periphery of the O ring member 102.

However, for the sealing member 100 described in Patent document 1, since the peripheral ring member 104 made of a resin other than a rubber exists on the sealing face, a vacuum seal performance is extremely deteriorated.

As shown in FIG. 17, for a sealing member 106 described in Patent document 2, a member 110 made of a corrosive resistant material such as a circular fluorocarbon resin is disposed at least on the surface side with an atmosphere having a high reactivity on the surface of an O ring 108 made of a synthetic rubber, and other sections are made of a synthetic rubber.

However, for the sealing member 106 described in Patent document 2, as shown in FIG. 17, since the member 110 made of a corrosive resistant material such as a fluorocarbon resin must be disposed on a curved face having a small R of the O ring 108, it is difficult to manufacture the sealing member and a cost is increased.

As shown in FIG. 18, a sealing member 112 described in Patent document 3 has a configuration in which sections other than the upper and lower contact faces of an O ring 114 made of a fluorocarbon rubber or the like are coated by metal members 116 made of aluminum or the like having a cross section in an almost C shape.

However, since the sealing member 112 described in Patent document 3 is provided with the metal members 116 made of aluminum or the like in an almost C shape, metal particles occur in use, and a semiconductor is contaminated in manufacturing the semiconductor, thereby deteriorating the quality.

For a sealing member 118 described in Patent document 4, as shown in FIG. 19, a first sealing material 120 made of a fluorocarbon rubber is joined in an integrated manner with a second sealing material 122 made of a fluorocarbon resin that is a plastic material that is harder than the fluorocarbon rubber at a joining portion 124 in the concave and convex fitting shape.

However, for the sealing member 118 described in Patent document 4, since the joining portion 124 between a rubber and a resin other than a rubber has an extremely complicated shape, it is difficult to manufacture the sealing member and a cost is increased.

In addition, as shown in FIG. 20, Patent document 4 discloses a sealing material 134 in which a first sealing material 126 made of a fluorocarbon rubber is joined with a second sealing material 128 made of a fluorocarbon resin that is a plastic material that is harder than the fluorocarbon rubber at linear edge faces 130 and 132.

However, for the sealing member 134, although it is easy to manufacture the sealing member, a sealing groove that can be used is restricted to a sealing groove having a cross section in an almost rectangular shape in which a width of a bottom portion side of the sealing groove and a width of an opening portion side of the sealing groove are almost equivalent to each other, or to a sealing groove 136 corresponding to the shape of the sealing member 134.

Consequently, this sealing member cannot be applied to so-called a "dove tail groove", which is a sealing groove having a special shape in which a width of a bottom portion side of the sealing groove is larger than a width of an opening portion side of the sealing groove, and which can be used for a semiconductor manufacturing apparatus.

The present invention was made in consideration of such conditions, and an object of the present invention is to provide a composite sealing material having performances such as a vacuum seal performance, a plasma resistance, and a corrosive gas resistance, capable of preventing the vacuum seal performance from being deteriorated even in the case in which the composite sealing material is repeatedly used, capable of preventing metal particles from occurring in use, and capable of being easily manufactured at a low cost.

Another object of the present invention is to provide a composite sealing material applicable to so-called a "dove tail groove", which is a sealing groove having a special shape in which a width of a bottom portion side of the sealing groove is larger than a width of an opening portion side of the sealing groove, and which can be used for a semiconductor manufacturing apparatus.

Means for Solving the Problems

The present invention was made in order to solve the above problems of the prior art and to achieve the above objects.

A composite sealing material to be installed in a sealing groove related to the present invention is characterized by comprising:

a first sealing member, which is located on one side wall side of the sealing groove in the case in which the composite sealing material is installed in the sealing groove, and a second sealing member, which is located on the other side wall side of the sealing groove in the case in which the composite sealing material is installed in the sealing groove, wherein the first sealing member is made of an elastic member, the second sealing member is made of a synthetic resin material that is harder than the first sealing member, the first sealing member is provided with a first sealing member body and a first sealing portion provided with a swelled portion swelling externally from an opening portion of the sealing groove, the second sealing member is provided with a second sealing member body and a second sealing portion located on the opening portion side of the sealing groove as compared with the second sealing member body, the second sealing portion of the second sealing member is provided with a second extended portion extending to the first sealing member side, the first sealing member body is provided with a first extended portion extending to the bottom portion 14 side of the sealing groove of the second extended portion of the second sealing member, in the case in which the composite sealing material is press-fitted, the swelled portion of the first sealing portion of the first sealing member is press-fitted to impart sealing ability, and the second extended portion of the second sealing member is pressed to the opening portion side of the sealing groove through the first extended portion of the first sealing member, and an upper face edge portion of the second sealing portion is press-fitted to impart sealing ability.

By the above configuration, in the case in which the composite sealing material is press-fitted, the swelled portion of the first sealing portion of a first sealing member is press-fitted to impart sealing ability. In addition, the second extended portion of a second sealing member is pressed to the opening portion side of a sealing groove through the first extended portion of the first sealing member, and the upper surface of the second sealing portion, in particular, an upper face edge portion of the second sealing portion is press-fitted by a stress concentration to impart sealing ability.

Moreover, in this state, since the second sealing member is made of a plastic material that is harder than the first sealing member, by locating the second sealing member side onto a chamber side that is a side of severe environments such as a corrosive gas and plasma in a semiconductor manufacturing apparatus such as a dry etching apparatus and a plasma CVD apparatus for instance, the upper surface of the second sealing portion of the second sealing member is press-fitted, the swelled portion of the first sealing portion, which is a press-fitted portion of the first sealing member made of an elastic member, can be protected from a corrosive gas and plasma or the like, thereby preventing the sealing ability from being deteriorated.

Moreover, in this case, since the second sealing member made of a plastic material that is harder than the first sealing member is located on the side of severe environments, a resistance against a corrosive gas and plasma or the like is satisfactory, and the entire of the first sealing member made of an elastic member can be protected from a corrosive gas and plasma or the like, thereby preventing the sealing ability from being deteriorated.

Furthermore, without joining in an integrated manner the first sealing member made of an elastic member and the second sealing member made of a plastic material that is harder than the first sealing member by the conventional complicated fitting concave and convex portions, the first sealing member and the second sealing member can be easily joined in an integrated manner only by joining a second extended portion of the second sealing member extending to the first sealing member side and a first extended portion of the first sealing member extending to the sealing groove side of the second extended portion, thereby simplifying manufacturing and reducing a manufacturing cost.

As described above, since the second sealing member is made of a synthetic resin that is a plastic material that is harder than the first sealing member, a resistance against a corrosive gas and plasma or the like is satisfactory, and the entire of the first sealing member made of an elastic member can be protected from a corrosive gas and plasma or the like, thereby preventing the sealing ability from being deteriorated.

A composite sealing material related to the present invention is characterized in that the swelled portion of the first sealing portion of the first sealing member swells in a curved face pattern to the opening portion side of the sealing groove.

As described above, since the swelled portion of the first sealing portion, which is a press-fitted portion of the first sealing member to be a sealing face, swells in a face pattern, the sealing ability in press-fitting becomes satisfactory.

A composite sealing material related to the present invention is characterized in that the bottom face on the sealing groove side of the first sealing member body is in an almost flat shape.

As described above, since the bottom face on the sealing groove side of the first sealing member body is in an almost flat shape, a contact area with a bottom portion of the sealing groove is larger, thereby improving an effect for preventing the composite sealing material from rolling and the sealing ability from deteriorating in use.

A composite sealing material related to the present invention is characterized in that the first extended portion of the first sealing member and the second extended portion of the second sealing member come into contact with each other at a flat face almost parallel to the bottom portion of the sealing groove.

As described above, the first extended portion of the first sealing member and the second extended portion of the second sealing member come into contact with each other at an almost flat face, thereby simplifying a processing. In addition, the first sealing member and the second sealing member can be easily joined in an integrated manner only by joining such almost flat faces, thereby simplifying manufacturing and reducing a manufacturing cost.

A composite sealing material related to the present invention is characterized in that the first extended portion 38 of the first sealing member 20 and the second extended portion 36 of the second sealing member 24 come into contact with each other at a tapered face 25 in which a diameter becomes smaller as it is closer to the bottom portion 14 of the sealing groove 12.

By the above configuration, even in the case in which a sealing material has a large diameter and is installed in a dove tail groove, a plasma resistance as well as sealing ability can be displayed.

A composite sealing material related to the present invention is characterized in that the second sealing member body is provided with a bottom extended portion extending to the first sealing member side at the bottom portion side of the sealing groove.

By the above configuration, the second sealing member made of a plastic material that is harder than the first sealing member is located on a chamber side that is a side of severe environments such as a corrosive gas and plasma, and the bottom extended portion of the second sealing member is located between the bottom portion of the sealing groove and the bottom portion of the composite sealing material. Consequently, the composite sealing material can be protected from a corrosive gas and plasma or the like circling into a gap between the bottom portion of the sealing groove and the bottom portion of the composite sealing material, thereby preventing the sealing ability from being deteriorated.

A composite sealing material related to the present invention is characterized in that an edge face of the first sealing member body on one side wall side of the sealing groove is a tapered face in which a diameter becomes smaller as it is closer to the bottom portion 14 of the sealing groove 12.

By the above configuration, in the case in which the composite sealing material is press-fitted, the first sealing member is swelled to a gap formed between the tapered face and the side wall of the sealing groove. Consequently, it can be prevented that the first sealing member is protruded from the opening portion of the sealing groove and that the first sealing member is damaged. Accordingly, a deterioration of sealing ability and a cause of contamination can also be prevented.

Moreover, in the case in which the composite sealing material is installed in the sealing groove, in particular, in so-called a "dove tail groove", which is a sealing groove having a special shape in which a width of a bottom portion side of the sealing groove is larger than a width of an opening portion side of the sealing groove, and which can be used for a semiconductor manufacturing apparatus, the composite sealing material can be inserted along the tapered face, thereby simplifying an installing operation.

A composite sealing material related to the present invention is characterized in that the sealing groove is a dove tail groove in which a width of the bottom portion side of the sealing groove is larger than a width of the opening portion side of the sealing groove.

Accordingly, the composite sealing material related to the present invention can be applied to so-called a "dove tail groove", which is a sealing groove having a special shape in which a width of a bottom portion side of the sealing groove is larger than a width of an opening portion side of the sealing groove, and which can be used for a semiconductor manufacturing apparatus.

A composite sealing material related to the present invention is characterized in that the sealing groove has a cross section in an almost rectangular shape in which a width of the bottom portion side of the sealing groove and a width of the opening portion side of the sealing groove are almost equivalent to each other.

Accordingly, the composite sealing material related to the present invention can also be applied to the sealing groove having a cross section in an almost rectangular shape in which a width of the bottom portion side of the sealing groove and a width of the opening portion side of the sealing groove are almost equivalent to each other.

A composite sealing material related to the present invention is characterized in that the first sealing member is made of a rubber.

By the above configuration, since the first sealing member is made of a rubber that is an elastic member, in the case in which the composite sealing material is press-fitted, the swelled portion of the first sealing portion of the first sealing member is press-fitted to impart high sealing ability due to an elastic force of the rubber.

A composite sealing material related to the present invention is characterized in that the rubber forming the first sealing member is a fluorocarbon rubber.

As described above, since the rubber forming the first sealing member is a fluorocarbon rubber, even in the case in which the first sealing member comes into contact with a corrosive gas or plasma, a resistance against a corrosive gas and plasma or the like is satisfactory, thereby preventing the sealing ability from being deteriorated.

A composite sealing material related to the present invention is characterized in that a synthetic resin forming the second sealing member is made of at least one kind of a synthetic resin selected from a fluorocarbon resin, a polyimide resin, a polyamideimide resin, a polyetherimide resin, a polyphenylene sulfide resin, a polybenzimidazole resin, and a polyether ketone resin.

As described above, since a synthetic resin forming the second sealing member is made of at least one kind of a synthetic resin selected from a fluorocarbon resin, a polyimide resin, a polyamideimide resin, a polyetherimide resin, a polyphenylene sulfide resin, a polybenzimidazole resin, and a polyether ketone resin, a resistance against a corrosive gas and plasma or the like is extremely satisfactory, and the entire of the first sealing member made of an elastic member can be protected from a corrosive gas and plasma or the like, thereby preventing the sealing ability from being deteriorated.

A composite sealing material related to the present invention is characterized in that a seal height L3 of the first sealing member and a seal height L5 of the second sealing member are set in such a manner that a squeeze ratio of L3 is equivalent to or larger than a squeeze ratio of L5, wherein a squeeze ratio is calculated by the expression of (seal height−groove depth L4)/seal height×100.

By the above configuration, a deformation of the first sealing member is not prevented by the second sealing member having a high rigidity, thereby stabilizing sealing ability.

EFFECT OF THE INVENTION

According to a composite sealing material relates to the present invention, the composite sealing material has performances such as a vacuum seal performance, a plasma resistance, and a corrosive gas resistance, is capable of preventing the vacuum seal performance from being deteriorated even in the case in which the composite sealing material is repeatedly used, is capable of preventing metal particles from occurring in use, and is capable of being easily manufactured at a low cost.

Moreover, according to a composite sealing material related to the present invention, the composite sealing material can be applied to so-called a "dove tail groove", which is a sealing groove having a special shape in which a width of a bottom portion side of the sealing groove is larger than a width of an opening portion side of the sealing groove, and which can be used for a semiconductor manufacturing apparatus.

Furthermore, even in the case in which a specified tightening pressure cannot be obtained if the first extension portion of the first sealing member comes into contact with the second extension portion of a second sealing member at the tapered face, a sufficient plasma resistance as well as sealing ability can be displayed. Consequently, even in the case in which the composite sealing material is adopted to a sealing material having a large diameter in which it is difficult to load a wide sealing face with a sufficient tightening force, sufficient sealing ability and plasma resistance can also be displayed.

EXPLANATIONS OF LETTERS OR NUMERALS

Figure 1:
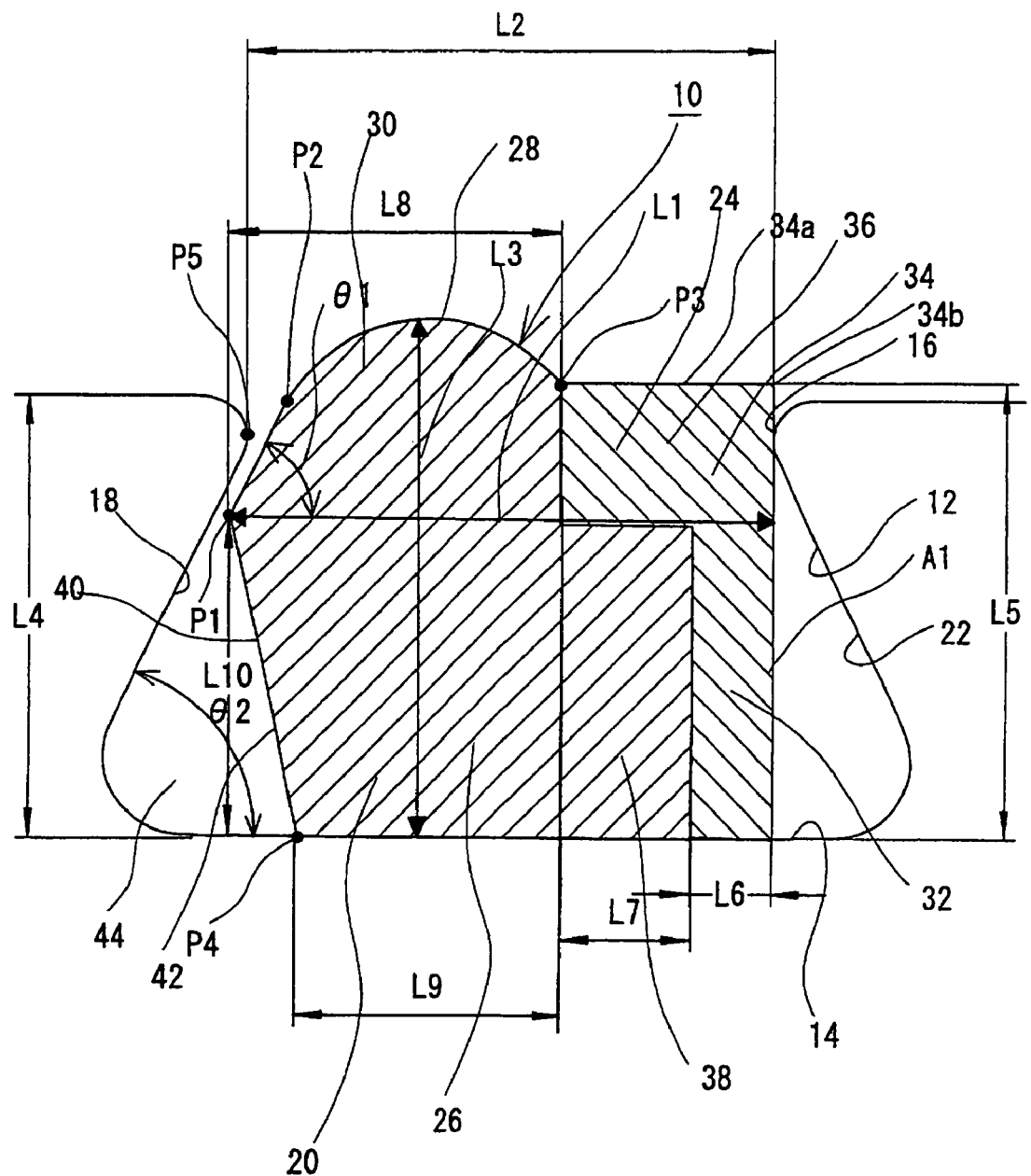
FIG. 1 is a cross-sectional view showing a state in which a composite sealing material related to the present invention is installed in so-called a "dove tail groove", which is a sealing groove.

10: composite sealing material
12: sealing groove
14: bottom portion
16: opening portion
18: side wall
20: first sealing member
22: side wall
24: second sealing member
26: first sealing member body
28: swelled portion
30: first sealing portion
32: second sealing member body
34: second sealing portion
36: second extended portion
38: first extended portion
40: edge face
42: tapered face
44: gap
46: bottom extended portion

BEST MODE OF CARRYING OUT THE INVENTION

An embodiment (example) of the present invention will be described below in detail with reference to the drawings.

Figure 2:
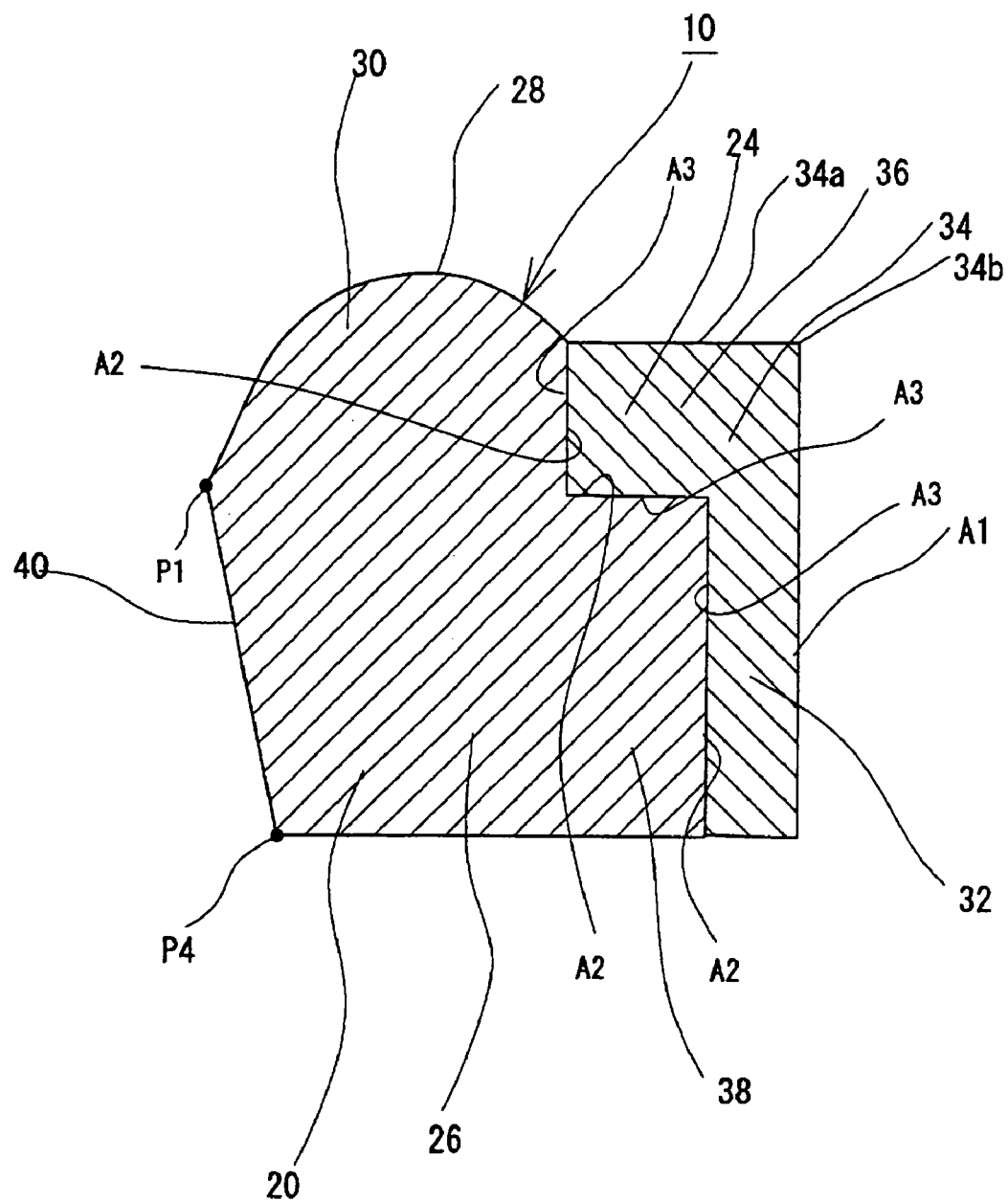
FIG. 2 is a schematic view for illustrating a dimensional relationship between the composite sealing material shown in FIG. 1 and the sealing groove.

FIG. 1 is a cross-sectional view showing a state in which a composite sealing material related to the present invention is installed in so-called a "dove tail groove", which is a sealing groove. FIG. 2 is a schematic view for illustrating a dimensional relationship between the composite sealing material shown in FIG. 1 and the sealing groove. FIGS. 3 to 6 are cross-sectional views for illustrating a state in which a composite sealing material related to the present invention is installed and press-fitted in a sealing groove.

In FIG. 1, a numeral 10 represents a composite sealing material related to the present invention as a whole. The composite sealing material 10 is in an almost circular shape and is installed in a sealing groove 12 in an almost circular shape.

For instance, the sealing groove 12 is so-called a "dove tail groove", which is a sealing groove having a special shape in which a width of a bottom portion 14 side of the sealing groove 12 is larger than a width of an opening portion 16 side of the sealing groove 12, and which can be used for a semiconductor manufacturing apparatus such as a dry etching apparatus and a plasma CVD apparatus.

The composite sealing material 10 is provided with a first sealing member 20, which is located on one side wall 18 side of the sealing groove 12, that is, at a position (for instance, atmospheric side) opposite to a chamber side that is a side of severe environments such as a corrosive gas and plasma in a semiconductor manufacturing apparatus in the case in which the composite sealing material 10 is installed in such a sealing groove 12.

Moreover, the composite sealing material 10 is provided with a second sealing member 24, which is located on the other side wall 22 side of the sealing groove 12, that is, at a position on a chamber side that is a side of severe environments such as a corrosive gas and plasma in a semiconductor manufacturing apparatus in the case in which the composite sealing material 10 is installed in the sealing groove 12.

In such a case, the first sealing member 20 has a cross section in an almost L shape as shown in FIG. 1, and the second sealing member 24 has a cross section in an almost reverse L shape complementary to the shape of the first sealing member 20.

More specifically, the first sealing member 20 is provided with a first sealing member body 26 and a first sealing portion 30 provided with a swelled portion 28 smoothly swelling in a curved face shape externally from an opening portion 16 of the sealing groove 12.

The second sealing member 24 is provided with a second sealing member body 32 and a second sealing portion 34 located on the opening portion 16 side of the sealing groove 12 as compared with the second sealing member body 32. Moreover, the second sealing portion 34 of the second sealing member 24 is provided with a second extended portion 36 extending to the first sealing member 20 side.

On the other hand, the first sealing member body 26 is provided with a first extended portion 38 extending to the sealing groove side of the second extended portion 36 of the second sealing member 24.

Moreover, an edge face 40 of the first sealing member body 26 on one side wall 18 side of the sealing groove 12 is a tapered face 42 inclined to the second sealing member 24 side.

By the above configuration, in the case in which the composite sealing material 10 is press-fitted, the first sealing member 20 is swelled to a gap 44 formed between the tapered face 42 and the side wall 18 of the sealing groove 12. Consequently, it can be prevented that the first sealing member 20 is protruded from the opening portion 16 of the sealing groove 12 and that the first sealing member 20 is damaged. Accordingly, a deterioration of sealing ability and a cause of contamination can also be prevented.

Moreover, in the case in which the composite sealing material 10 is installed in the sealing groove 12, in particular, in so-called a "dove tail groove", which is a sealing groove having a special shape in which a width of a bottom portion 14 side of the sealing groove 12 is larger than a width of an opening portion side of the sealing groove, and which can be used for a semiconductor manufacturing apparatus, the tapered face 42 is abutted to the opening portion of the dove tail groove and the composite sealing material 10 is inserted in a sliding manner along the tapered face 42, thereby enabling the composite sealing material 10 to be installed and simplifying an installing operation.

In this case, the first sealing member 20 is made of an elastic member, and the second sealing member 24 is made of a plastic material that is harder than the first sealing member 20.

By the above configuration, as described in FIGS. 3 to 6 later, in the case in which the composite sealing material 10 is press-fitted, the swelled portion 28 of the first sealing portion 30 of a first sealing member 20 is press-fitted to impart sealing ability, the second extended portion 36 of a second sealing member 24 is pressed to the opening portion 16 side of a sealing groove 12 through the first extended portion 38 of the first sealing member 20, and the upper surface 34a of the second sealing portion 34 is press-fitted to impart sealing ability.

In this case, it is preferable that the first sealing member 20 is made of a rubber that is an elastic member. As a rubber, any of a natural rubber and a synthetic rubber can be used.

As described above, since the first sealing member 20 is made of a rubber that is an elastic member, in the case in which the composite sealing material 10 is press-fitted, the swelled portion 28 of the first sealing portion 30 of a first sealing member 20 is press-fitted to impart high sealing ability due to an elastic force of the rubber.

Moreover, in this case, it is preferable that the rubber forming the first sealing member 20 is a fluorocarbon rubber.

As such a fluorocarbon rubber, there can be used a vinylidene fluoride rubber of a binary system such as a vinylidene fluoride/hexafluoropropylene copolymer, a vinylidene fluoride/trifluorochloroethylene copolymer, and a vinylidene fluoride/pentafluoropropylene copolymer, a vinylidene fluoride rubber of a ternary system such as a vinylidene fluoride/tetrafluoroethylene/hexafluoropropylene copolymer, a vinylidene fluoride/tetrafluoroethylene/perfluoroalkylvinyl ether copolymer, and a vinylidene fluoride/tetrafluoroethylene/propylene copolymer, a tetrafluoroethylene/propylene copolymer, a tetrafluoroethylene/perfluoroalkylvinyl ether copolymer, and a thermoplastic fluorocarbon rubber.

As described above, since the rubber forming the first sealing member 20 is a fluorocarbon rubber, even in the case in which the first sealing member 20 comes into contact with a corrosive gas or plasma, a resistance against a corrosive gas and plasma or the like is satisfactory, thereby preventing the sealing ability from being deteriorated.

Moreover, it is preferable that the second sealing member 24 is made of a synthetic resin, preferably at least one kind of a synthetic resin selected from a fluorocarbon resin, a polyimide resin, a polyamideimide resin, a polyetherimide resin, a polyphenylene sulfide resin, a polybenzimidazole resin, and a polyether ketone resin.

As described above, since the second sealing member 24 is made of a synthetic resin that is a plastic material that is harder than the first sealing member 20, a resistance against a corrosive gas and plasma or the like is satisfactory, and the entire of the first sealing member 20 made of an elastic member can be protected from a corrosive gas and plasma or the like, thereby preventing the sealing ability from being deteriorated.

In this case, as such a fluorocarbon resin, there can be mentioned a polytetrafluoroethylene (PTFE) resin, a tetrafluoroethylene-perfluoroalkylvinyl ether copolymer (PFA) resin, a tetrafluoroethylene-hexafluoropropylene copolymer (FEP) resin, a tetrafluoroethylene-ethylene copolymer (ETFE) resin, a polyvinylidene fluoride (PVDF) resin, a polychlorotrifluoroethylene (PCTFE) resin, a chlorotrifluoroethylene-ethylene copolymer (ECTFE) resin, and a polyvinyl fluoride (PVF) resin. Among the above resins, PTFE is preferable in consideration of a heat resistance, a corrosive gas resistance, and a plasma resistance.

As shown in FIGS. 1 and 2, as a seal width L1 of the composite sealing material 10 is larger than a groove width L2 of the opening portion 16 of the sealing groove 12, a dropping out resistance of the composite sealing material 10 from the sealing groove 12 is increased, and it becomes however difficult to install the composite sealing material 10. Therefore, it is preferable that the seal width L1 is in the range of 101% to 130% of the groove width L2.

Moreover, as shown in FIG. 1, it is preferable to set a seal height L3 of the first sealing member 20 in such a manner that a seal squeeze ratio is in the range of 3% to 45%, preferably in the range of 5% to 30%. In this case, a squeeze ratio is calculated by the expression of (seal height−groove depth L4)/seal height−100.

As shown in FIG. 1, in order to improve a plasma screening effect, it is necessary to set a height L5 of the second sealing member 24 made of a synthetic resin to be at least equivalent to or larger than the groove depth L4 of the sealing groove 12 to a certain degree. However, the second sealing member 24 made of a synthetic resin has a rigidity and is hard to be deformed as compared with the first sealing member 20 made of an elastic material, and the second sealing member 24 may be broken in the case in which an allowable deforming amount is exceeded. Therefore, it is preferable that a squeeze ratio is in the range of 0% to 35%.

Moreover, in the case in which a deformation of the first sealing member 20 is prevented by the second sealing member 24 having a high rigidity, the potential of unstable sealing ability is increased. Consequently, it is necessary to set the squeeze ratios in such a manner that a squeeze ratio of L3 is equivalent to or larger than a squeeze ratio of L5.

In this case, a squeeze ratio is calculated by the expression of (seal height−groove depth L4)/seal height×100. Moreover, as shown in FIG. 1, a seal height of the first sealing member 20 is L3 and a seal height of the second sealing member 24 is L5.

As a width L6 of the second sealing member body 32 of the second sealing member 24 made of a synthetic resin is narrower, a deformation of the first sealing member 20 made of a rubber is more stable. However, the width L6 is preferably at least 50 μm in consideration of workability.

The second sealing member 24 made of a synthetic resin has an insufficient restoring force. However, since a restoring force of a rubber of the first extended portion 38 of the first sealing member 20 made of a rubber is applied to a width L7 of the second extended portion 36 of the second sealing member 24, the first sealing member 20 and the second sealing member 24 always come into contact with each other, thereby screening plasma.

Consequently, as a width L7 of the second extended portion 36 of the second sealing member 24 is larger, a restoring force of a rubber of the first extended portion 38 of the first sealing member 20 made of a rubber is applied to a width L7 of the second extended portion 36, thereby stabilizing a plasma screening effect. However, in the case in which a width L8 of the first sealing portion 30 of the first sealing member 20 that comes into contact with a matching member is narrower, a seal width in compression is reduced, thereby preventing stable sealing ability from being obtained. Therefore, it is preferable that a width L7 is 70% or less of a width L8.

As a width L8 of the first sealing portion 30 of the first sealing member 20 is larger, a contact portion with a matching member is larger, thereby stabilizing a sealing. However, a width L6+L7 of the second sealing portion 34 of the second sealing member 24 is reduced, thereby deteriorating a plasma screening effect.

Consequently, it is preferable that a width L8 is in the range of 30% to 90% of a seal width L1 of the composite sealing material 10.

Moreover, in the case in which the first sealing member 20 made of a rubber is compressed, the first sealing member 20 is smoothly deformed toward the depths of the groove along one side wall 18 that is an inclined face of the sealing groove 12 that is a "dove tail groove". Therefore, an inclined face between a point P1, at which a seal width L1 of the composite sealing material 10 of the first sealing portion 30 of the first sealing member 20 is maximum, and a point P2, which has a height equivalent to that of the opening portion 16 of the sealing groove 12, is preferably set in such a manner that an angle θ1 is in the range of a dove tail groove angle θ2±2°.

Moreover, since a face from a point P2 of the first sealing portion 30 of the first sealing member 20 to a joining point P3 with a resin is a sealing face, the face is preferably a smoothly curved face.

As a width L9 of the bottom of the first sealing member body 26 of the first sealing member 20 is larger, a contact area with a bottom portion 14 of the sealing groove 12 is larger, thereby improving a rolling prevention effect of the composite sealing material 10. However, in the case in which the width L9 is larger than the groove width L2 of the opening portion 16 of the sealing groove 12, the composite sealing material 10 cannot be inserted into the sealing groove 12 that is a "dove tail groove". Therefore, it is preferable that the width L9 is in the range of 50% to 100% of the groove width L2 of the opening portion 16 of the sealing groove 12.

Moreover, it is preferable that a height L10 from the bottom face of the first sealing member body 26 of the first sealing member 20 to the point P1 of the seal maximum width is lower than a point P5 at which the groove width L2 of the opening portion 16 of the sealing groove 12 is narrowest.

However, in the case in which the height L10 is too small, a location of the center of gravity of the composite sealing material 10 is low and a length of the tapered face 42 is short. Consequently, in the case in which the composite sealing material 10 is inserted into the sealing groove 12 along the tapered face 42, the composite sealing material 10 is easy to fall down, more specifically, the composite sealing material 10 rolls in a direction in which the composite sealing material 10 drops out from the sealing groove 12, thereby causing an installation to be difficult. Therefore, it is preferable that the height L10 is in the range of 50% to 80% of the seal height L3 of the first sealing member 20.

In order to screen plasma, it is preferable that at least the entire face of a fluid contact region A1 is made of at least one kind of a synthetic resin selected from a fluorocarbon resin, a polyimide resin, a polyamideimide resin, a polyetherimide resin, a polyphenylene sulfide resin, a polybenzimidazole resin, and a polyether ketone resin.

As shown in FIG. 2, in the case in which a face between contact regions A2 and A3 of the first sealing member 20 and the second sealing member 24 is a curved face, a processing cost is higher. Consequently, it is preferable that the face between the contact regions A2 and A3 is simply almost flat face for a cost.

While a method of joining in an integrated manner the first sealing member 20 and the second sealing member 24 at the contact regions A2 and A3 of the first sealing member 20 and the second sealing member 24 is not restricted in particular, there can be adopted a publicly known joining method such as welding, depositing, bonding, and molding in an integrated manner. It is preferable to fabricate the composite sealing material 10 by joining in an integrated manner using an adhesive, preferably a heat resistant adhesive.

The composite sealing material 10 having the above configuration related to the present invention is used as shown in FIGS. 3 to 6.

Figure 3:
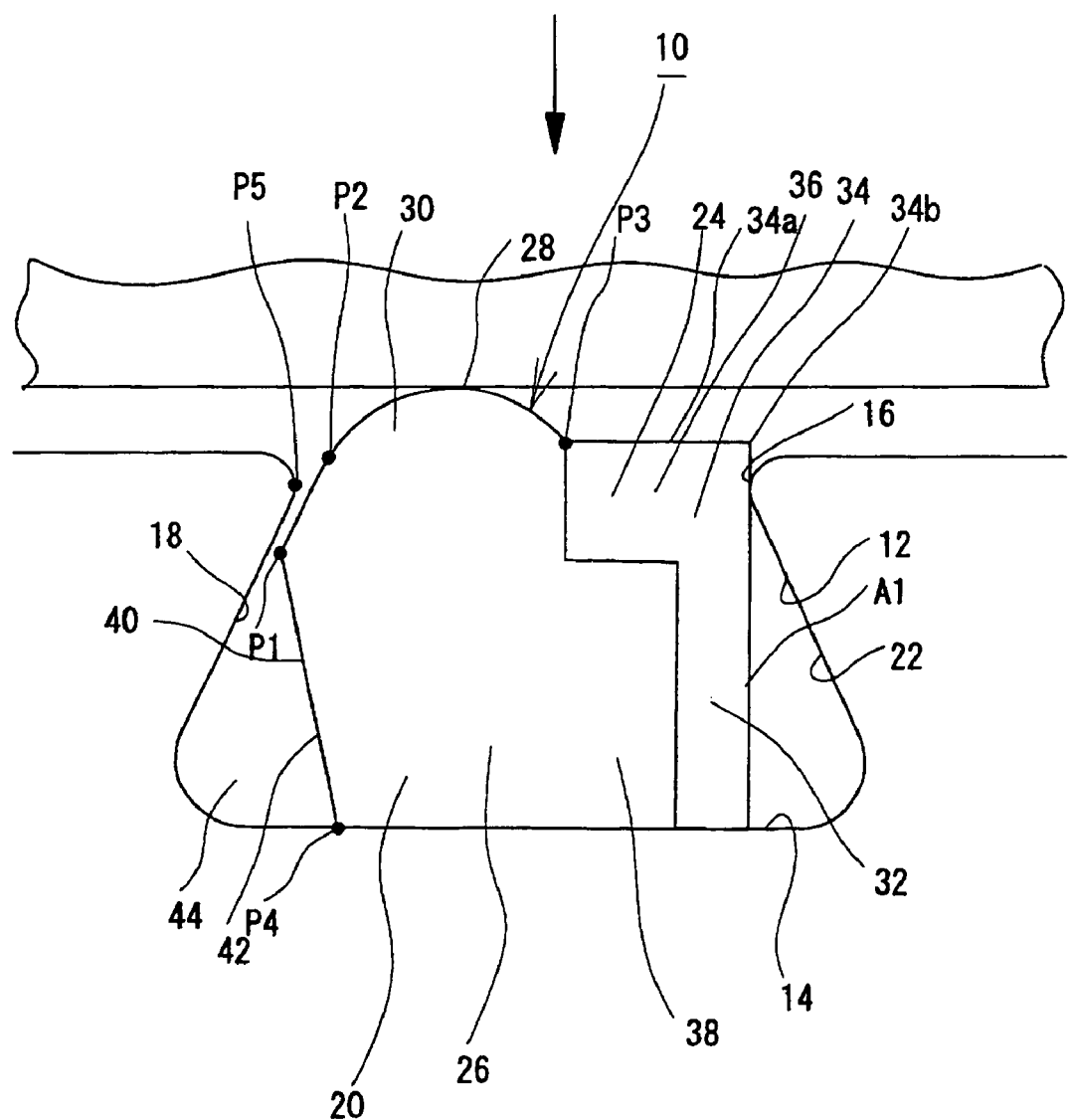
FIG. 3 is a cross-sectional view for illustrating a state in which a composite sealing material related to the present invention is installed and press-fitted in a sealing groove.

More specifically, as shown in FIG. 3, the composite sealing material 10 is installed in the sealing groove 12. In the case in which the composite sealing material 10 is installed in the sealing groove 12, the composite sealing material 10 can be installed along the tapered face 42 of the first sealing member 20, thereby simplifying an installing operation.

Figure 4:
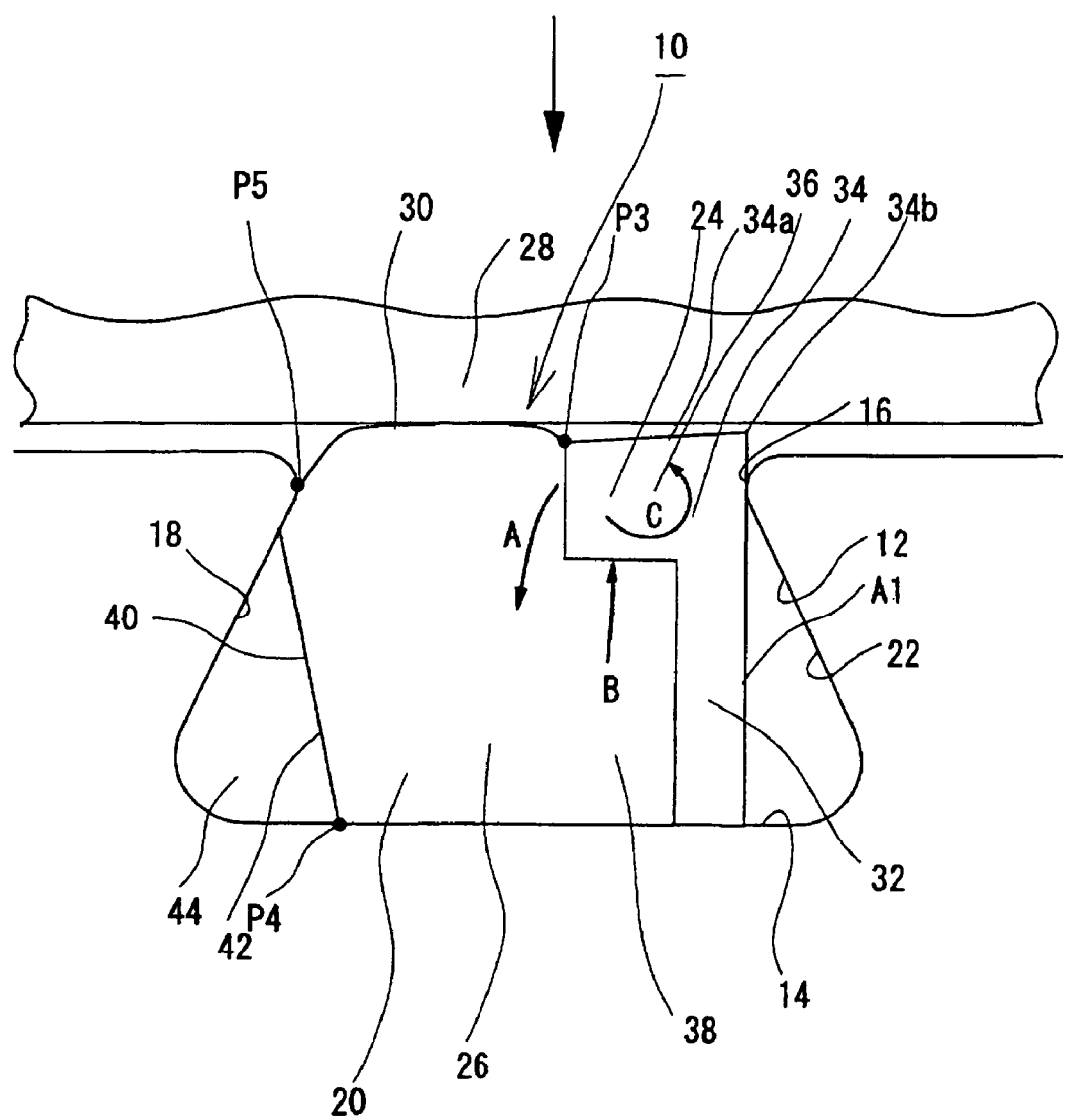
FIG. 4 is a cross-sectional view for illustrating a state in which a composite sealing material related to the present invention is installed and press-fitted in a sealing groove.
Figure 5:
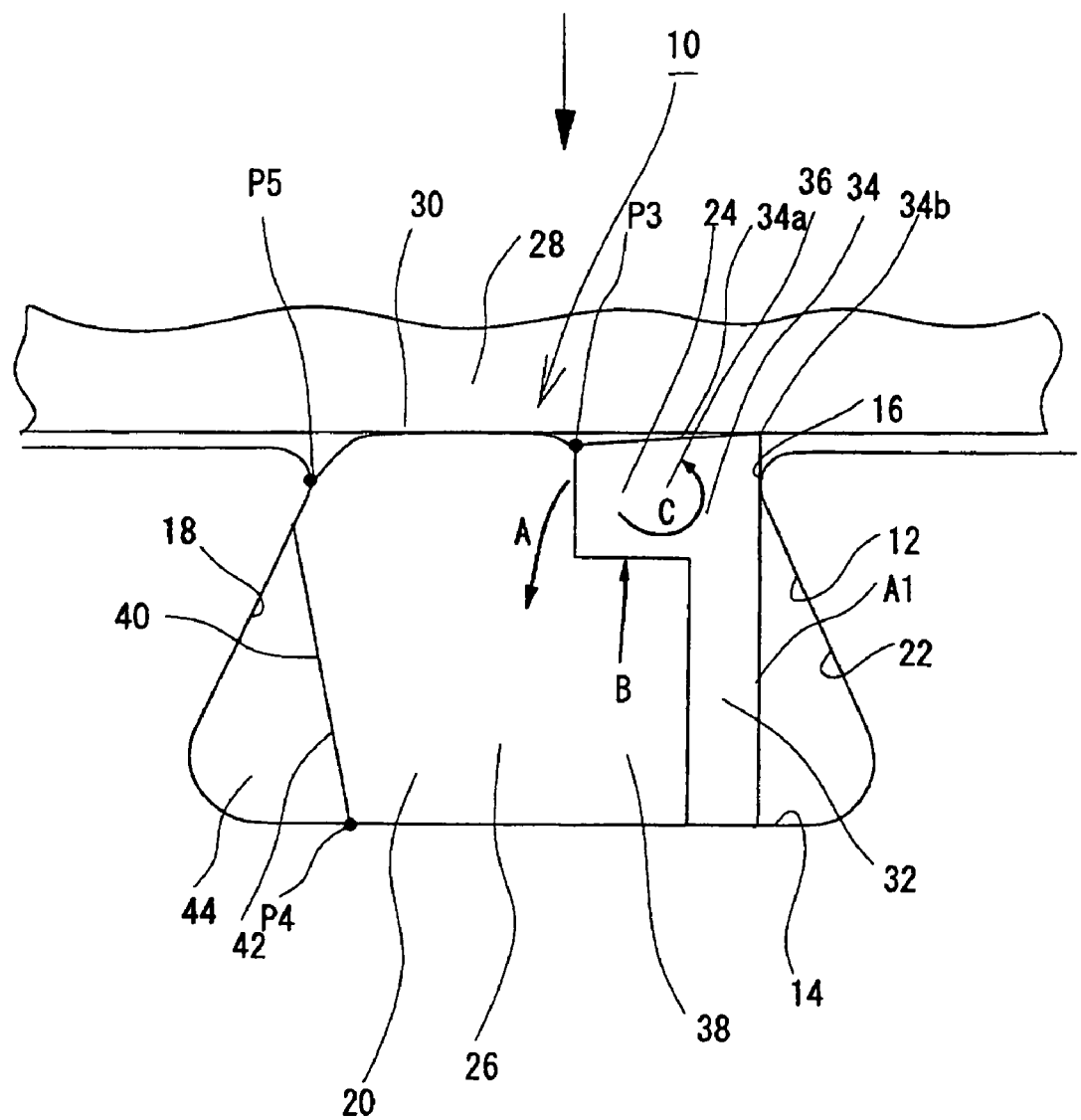
FIG. 5 is a cross-sectional view for illustrating a state in which a composite sealing material related to the present invention is installed and press-fitted in a sealing groove.
Figure 6:
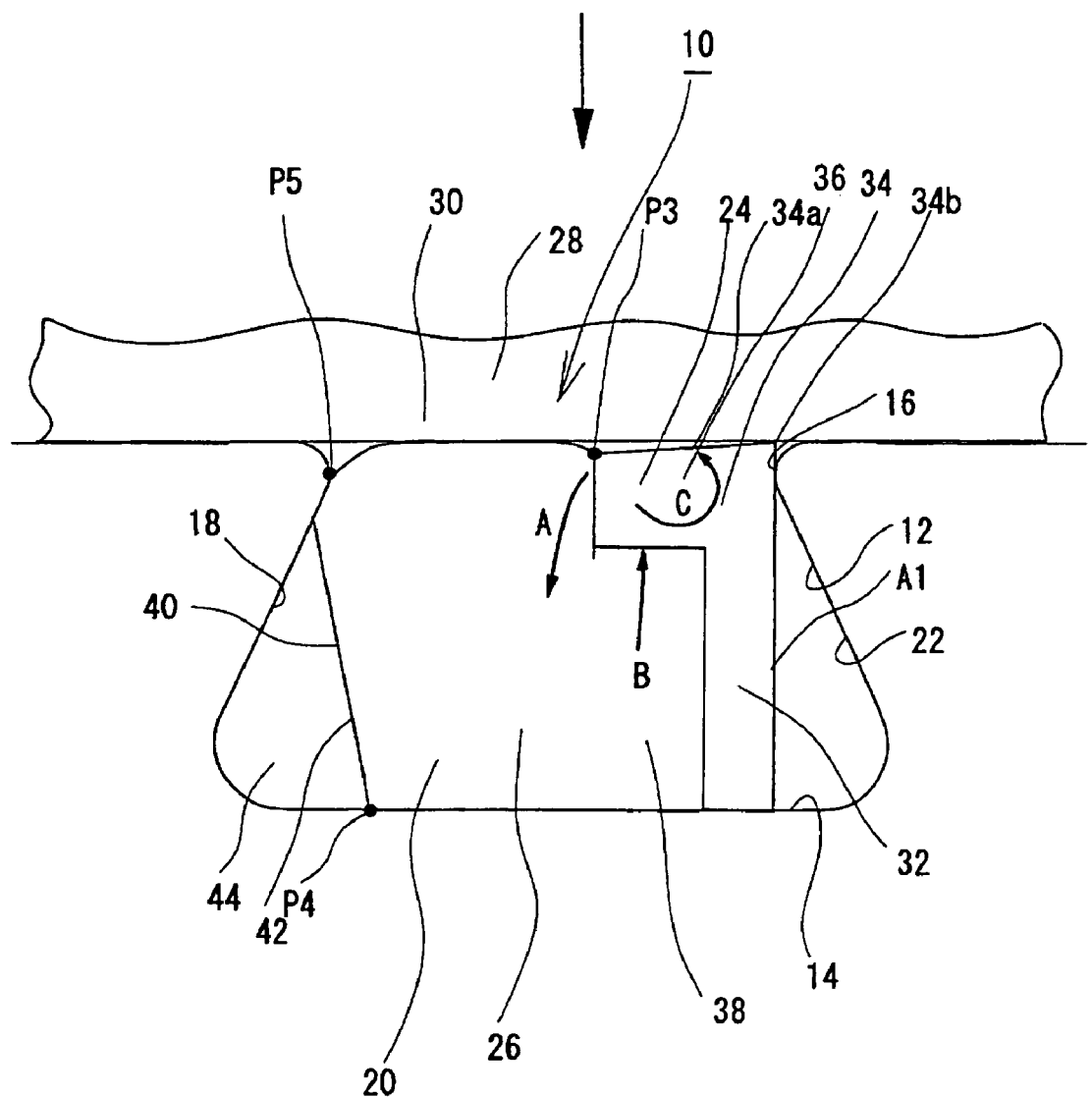
FIG. 6 is a cross-sectional view for illustrating a state in which a composite sealing material related to the present invention is installed and press-fitted in a sealing groove.

As shown in FIGS. 4 to 6, in the case in which the composite sealing material 10 is press-fitted, the swelled portion 28 of the first sealing portion 30 of the first sealing member 20 is press-fitted to impart sealing ability.

In this case, as shown in FIGS. 4 to 6, as well as the first sealing member 20 is deformed, the second extended portion 36 of a second sealing member 24 is pulled downward (toward the bottom portion 14 side of the sealing groove 12) as shown by an arrow A.

Moreover, as shown by an arrow B in FIGS. 4 to 6, the second extended portion 36 of the second sealing member 24 is pressed upward (toward the opening portion 16 side of the sealing groove 12) through the first extended portion 38 of the first sealing member 20, and an angular moment occurs as shown by an arrow C. The upper surface 34a of the second sealing portion 34 of the second sealing member 24, in particular, an upper face edge portion 34b of the second sealing portion 34 is then press-fitted by a stress concentration to impart sealing ability.

By the above configuration, in this state, since the second sealing member 24 is made of a plastic material that is harder than the first sealing member 20, by locating the second sealing member 24 side onto a chamber side that is a side of severe environments such as a corrosive gas and plasma in a semiconductor manufacturing apparatus such as a dry etching apparatus and a plasma CVD apparatus for instance, the upper surface 34a of the second sealing portion 34 of the second sealing member 24 (in particular the upper face edge portion 34b of the second sealing portion 34) is press-fitted, the swelled portion 28 of the first sealing portion 30, which is a press-fitted portion of the first sealing member 20 made of an elastic member, can be protected from a corrosive gas and plasma or the like, thereby preventing the sealing ability from being deteriorated.

Moreover, in this case, since the second sealing member 24 made of a plastic material that is harder than the first sealing member 20 is located on the side of severe environments, a resistance against a corrosive gas and plasma or the like is satisfactory, and the entire of the first sealing member 20 made of an elastic member can be protected from a corrosive gas and plasma or the like, thereby preventing the sealing ability from being deteriorated.

While the upper surface 34a of the second sealing portion 34 of the second sealing member 24 is flat in the present embodiment, the upper surface 34a can also be inclined in advance in such a manner that the upper face edge portion 34b of the second sealing portion 34 is located at a higher position.

Moreover, while both the first sealing member 20 and the second sealing member 24 are solid in the present embodiment, only one of or the both of the first sealing member 20 and the second sealing member 24 can also be hollow.

Figure 7:
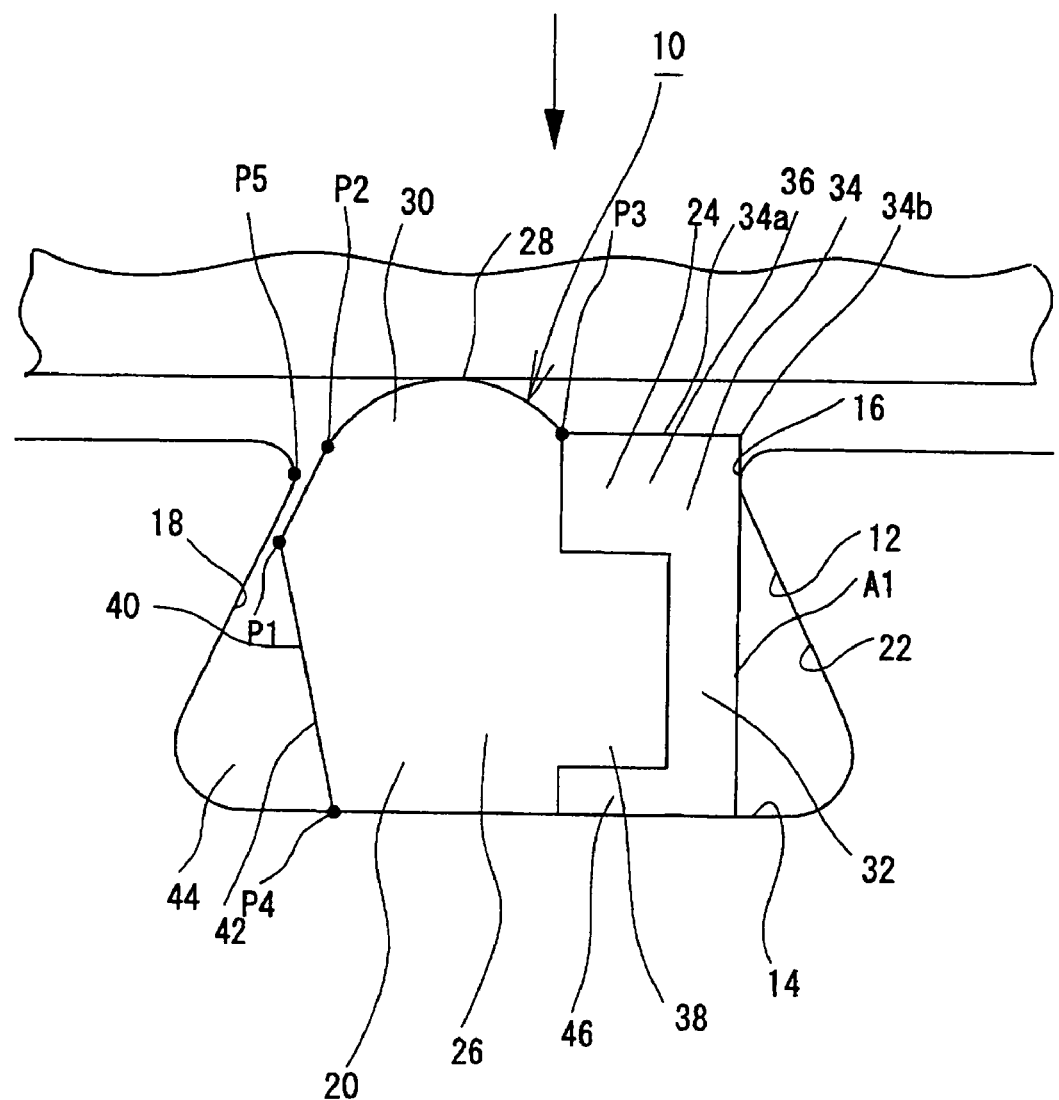
FIG. 7 is an expanded cross-sectional view showing a composite sealing material related to another embodiment of the present invention.

FIG. 7 is an expanded cross-sectional view showing a composite sealing material related to another embodiment of the present invention.

A composite sealing material 10 related to this embodiment has a configuration basically equivalent to that shown in FIG. 1, and elements equivalent to those illustrated in FIG. 1 are numerically numbered similarly.

As shown in FIG. 7, in the composite sealing material 10 related to this embodiment, the second sealing member body 32 of the second sealing member 24 is provided with a bottom extended portion 46 extending to the first sealing member 20 side at the bottom face side of the sealing groove 12.

By the above configuration, the second sealing member 24 made of a plastic material that is harder than the first sealing member 20 is located on a chamber side that is a side of severe environments such as a corrosive gas and plasma, and the bottom extended portion 46 of the second sealing member 24 is located between the bottom portion 14 of the sealing groove 12 and the bottom portion of the composite sealing material 10. Consequently, the composite sealing material 10 can be protected from a corrosive gas and plasma or the like circling into a gap between the bottom portion 14 of the sealing groove 12 and the bottom portion of the composite sealing material 10, thereby preventing the sealing ability from being deteriorated.

Figure 8:
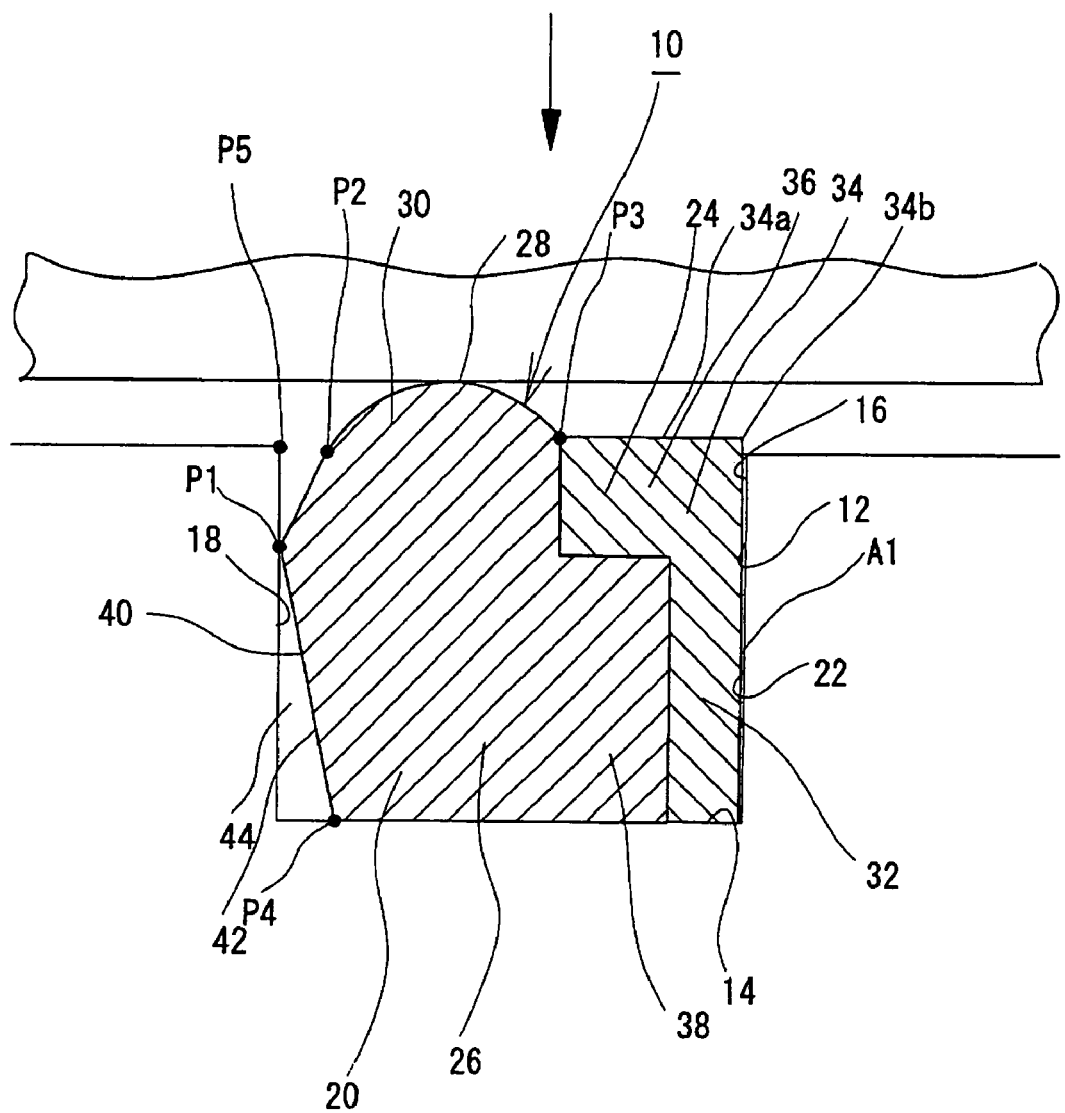
FIG. 8 is an expanded cross-sectional view showing a composite sealing material related to another embodiment of the present invention.

FIG. 8 is an expanded cross-sectional view showing a composite sealing material related to another embodiment of the present invention.

A composite sealing material 10 related to this embodiment has a configuration basically equivalent to that shown in FIG. 1, and elements equivalent to those illustrated in FIG. 1 are numerically numbered similarly.

As shown in FIG. 8, in the composite sealing material 10 related to this embodiment, the sealing groove 12 has a cross section in an almost rectangular shape in which a width of a bottom portion 14 side of the sealing groove 12 and a width of an opening portion 16 side of the sealing groove 12 are almost equivalent to each other.

Consequently, even in this case, there can be implemented an operation almost equivalent to that of the composite sealing material 10 related to the embodiment shown in FIG. 1, and the composite sealing material 10 related to the present invention can be applied to the sealing groove having a cross section in an almost rectangular shape in which a width of a bottom portion 14 side of the sealing groove 12 and a width of an opening portion 16 side of the sealing groove 12 are almost equivalent to each other.

Figure 9:
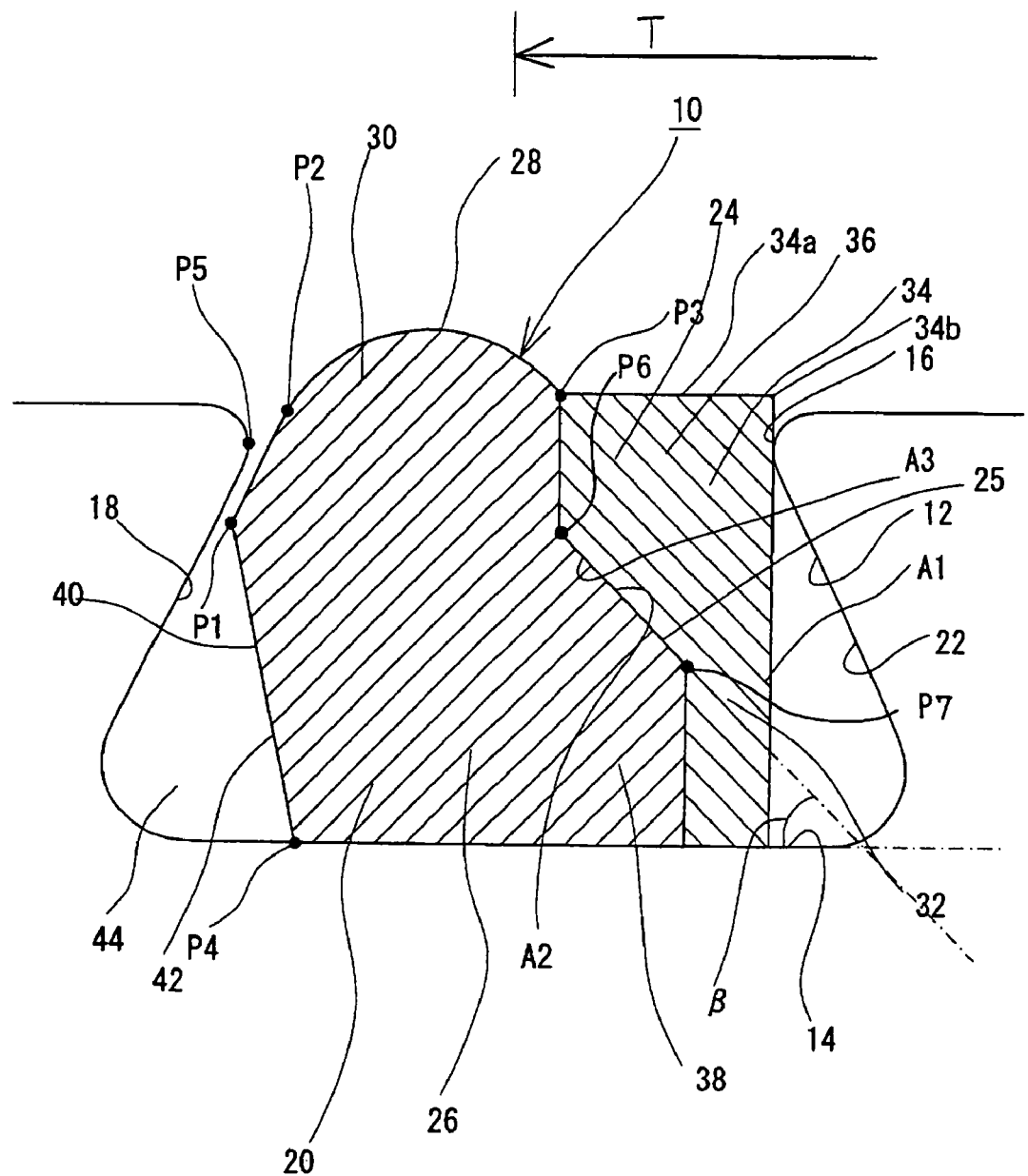
FIG. 9 is an expanded cross-sectional view showing a composite sealing material related to another embodiment of the present invention.

FIG. 9 is an expanded cross-sectional view showing a composite sealing material related to another embodiment of the present invention.

A composite sealing material 10 related to this embodiment has a configuration basically equivalent to that shown in FIG. 1, and elements equivalent to those illustrated in FIG. 1 are numerically numbered similarly.

As shown in FIG. 9, in the composite sealing material 10 related to this embodiment, a face between contact regions A2 and A3 of the first sealing member 20 and the second sealing member 24 is not a face parallel to the bottom portion 14 of the sealing groove 12 but an inclined face. More specifically, in the composite sealing material 10 shown in FIG. 9, a line that connects the points P6 and P7 located at the both edges of the contact regions A2 and A3 is inclined in the case in which the cross section thereof is viewed.

An inclined angle $\beta$ of an inclined tapered face 25 to the bottom portion 14 of the sealing groove 12 is not restricted in particular, and can be adjusted as needed.

Even in this case, while there can be implemented an operation almost equivalent to that of the composite sealing material 10 related to the embodiment shown in FIG. 1, the composite sealing material 10 having such a configuration can be preferably applied to a sealing material having a large diameter by the following reason.

That is to say, as a problem of a sealing material having a large diameter, in the case in which a diameter of the sealing material is three times the size of a normal sealing material and the same face pressure is ensured, a threefold tightening face pressure as a total load must be applied. However, since such a configuration causes a normal apparatus to be enlarged, it is difficult to ensure such a tightening pressure. Moreover, since a sealing material having a large diameter results in a long circumference and a long distance between bolts, it is difficult to apply a uniform tightening face pressure to the entire circumference of the sealing material. Consequently, for a sealing material having a large diameter, a tightening face pressure that can be applied in general is small and is not uniform.

However, in the case in which a tightening face pressure is small, a plasma resistance cannot be sufficiently ensured as a sealing material although sealabiliy can be ensured.

This is because, a rigidity of the second sealing member is too large in the case in which design dimensions for a small diameter described above are applied to a sealing material having a large diameter.

More specifically, while sealing ability can be displayed by deforming the swelled portion 28 of the first sealing member 20 made of an elastic material, a plasma resistance can be displayed only by deforming the second sealing member 24 made of a hard material. Consequently, although sealing ability can be ensured in a comparatively initial stage of tightening, a plasma resistance cannot be displayed if a sufficient tightening pressure is not applied. Therefore, it is thought that a rigidity of the second sealing member is weakened by shortening the width L6.

Figure 10:
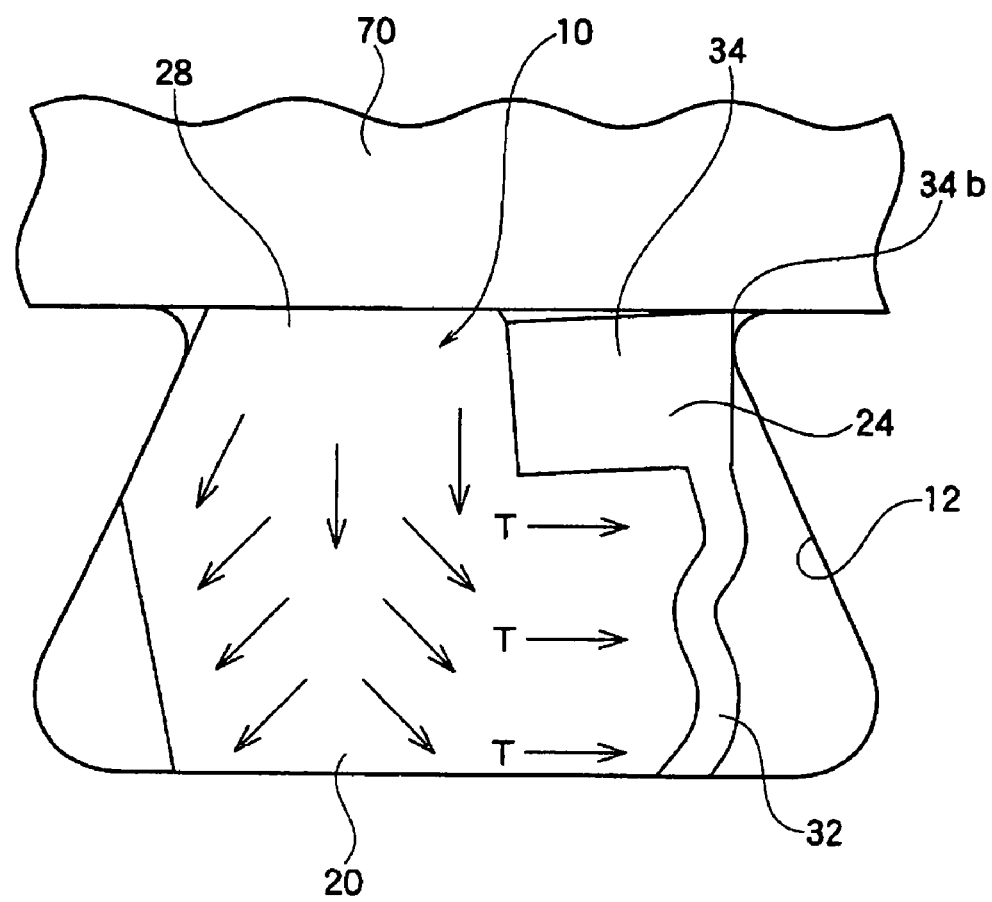
FIG. 10 is a schematic view showing a behavior in compression for the composite sealing material shown in FIG. 9.

As illustrating the above in FIG. 10, for the composite sealing material 10 having a large diameter, in the case in which the swelled portion 28 is tightened to a matching member 70, sealing ability can be ensured at the swelled portion 28. However, since a rigidity of the second sealing member is insufficient, a force in a direction of arrows T is applied to the second sealing member body 32 of the second sealing member 24 from the first sealing member 20, and the second sealing member body 32 is deformed to be an unstable wave shape. As a result, the upper face edge portion 34b of the second sealing portion 34 of the second sealing member 24 cannot be reliably deformed, and adhesiveness between the upper face edge portion 34b and the matching member 70 is deteriorated. By such a reason, a sufficient plasma resistance cannot be ensured.

In order to solve a problem of a deterioration of a plasma resistance due to a low tightening pressure for the composite sealing material 10 having a large diameter, as shown in FIG. 9, the contact regions A2 and A3 are formed by the tapered face 25 in the present embodiment.

Figure 11:
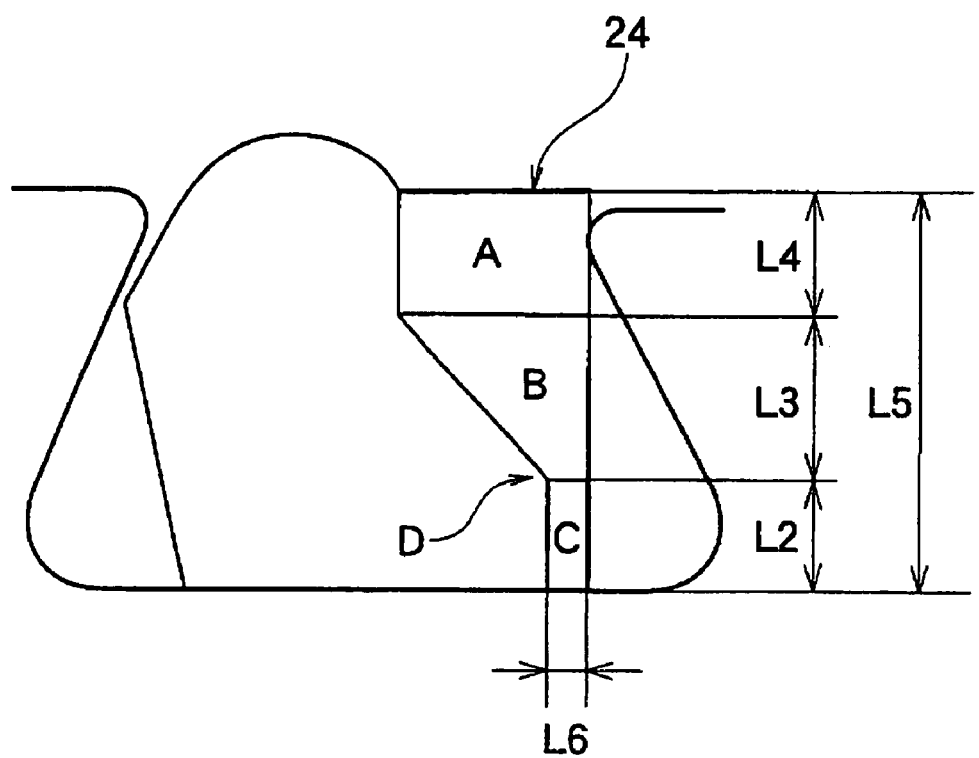
FIG. 11 is a schematic view showing a state in which the composite sealing material shown in FIG. 9, in particular the second sealing member is virtually classified.

More specifically, in the case in which the tapered face 25 is formed at the almost intermediate section of the contact region, as shown in FIG. 11, the second sealing member 24 can be classified into three regions: a wide plasma screening portion A, a deformation suppressing portion B having a cross section in a trapezoid shape, and a compression load absorbing portion C that is long in a longitudinal direction.

By such a classification into three regions, even in the case in which a tightening pressure to the matching member 70 is low, a plasma resistance can be improved as described below.

Figure 12:
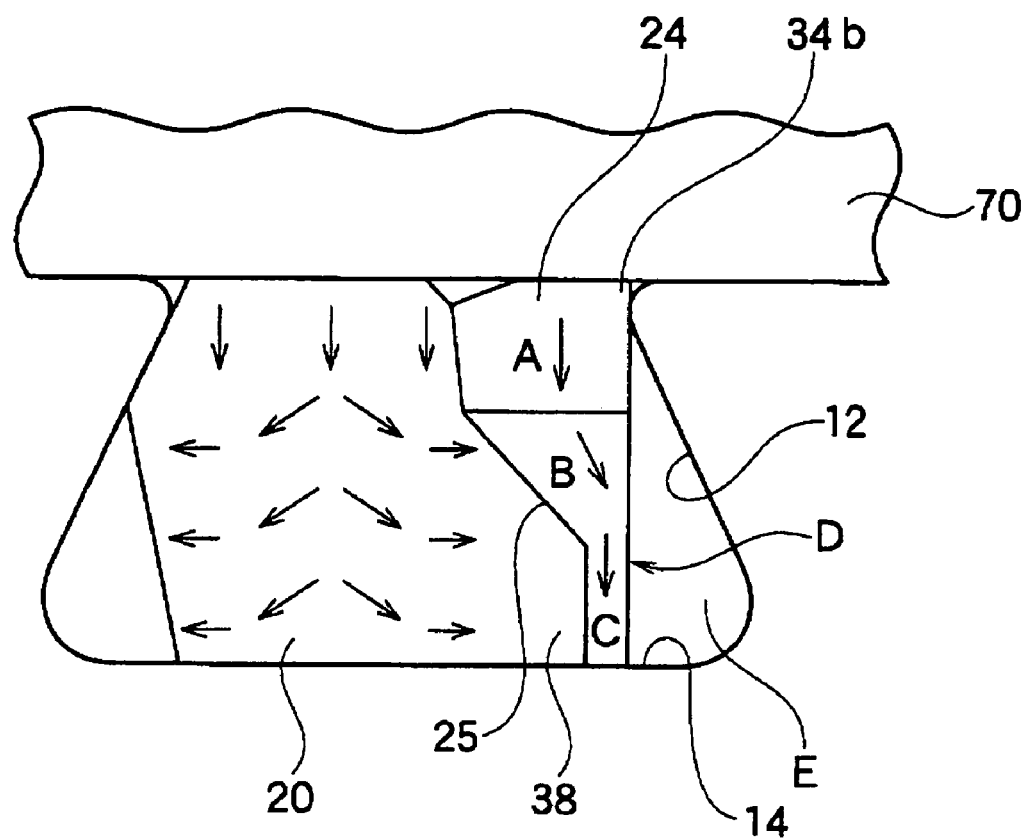
FIG. 12 is a schematic view showing a behavior of each part in the case in which the sealing material shown in FIG. 11 is compressed and deformed.

That is to say, in the case in which the sealing face is compressed by the matching member 70, as shown in FIG. 12, the first sealing member 20 is deformed toward the bottom portion 14 side of the sealing groove 12, and the first extended portion 38 enters a region E at the depths of the sealing groove 12.

In the case in which the first extended portion 38 enters a region E at the depths of the sealing groove 12 as described above, a portion D composed of the deformation suppressing portion B and the compression load absorbing portion C is deformed and compressed. However, since the second sealing member 24 is provided with the tapered face 25, a rigidity of the second sealing member 24 is high, thereby suppressing a deformation of the portion D.

In such a state, for the second sealing member 24, the plasma screening portion A is compressed by the matching member 70, and the upper face edge portion 34b thereof strongly comes into contact with the matching member 70, thereby obtaining a plasma screening effect. Moreover, even in the case of a low load, a plasma screening effect can also be obtained.

Furthermore, a load applied to the second sealing member 24 is absorbed due to a deformation of the compression load absorbing portion C, thereby enabling a tightening with a low load.

Here, as shown in FIG. 11, as the width L6 of the compression load absorbing portion C is larger, a processing accuracy and a handling property can be improved, however, a tightening force is larger. Since a processing accuracy and a handling property are also affected by a height L5 of the second sealing member 24, a ratio of the width L6 to the height L5 must be at least a certain value.

More specifically, it is preferable that the width L6 of the compression load absorbing portion C is at least 3% of the height L5, preferably at least 10% of the height L5.

As a height L2 of the compression load absorbing portion C is larger, the second sealing member 24 is easily deformed, however, the deformation is unstable. On the other hand, as the height L2 is smaller, a load required for the deformation of the second sealing member 24 is larger. Therefore, it is preferable that the height L2 is in the range of 10% to 40% of the height L5.

As a height L3 of the deformation suppressing portion B is larger, the deformation of the second sealing member 24 is stable, however, a height L4 of the plasma screening portion A is smaller. Therefore, it is preferable that the height L3 is up to 80% of the height L5.

EMBODIMENT

A seal performance and a plasma resistance were evaluated for the following samples.

1. Samples a) Samples Related to the Present Invention

Embodiment 1 (as shown in FIG. 1, equivalent to a composite sealing material in which a first protrusion and a second protrusion come into contact with each other perpendicularly Embodiment 2 (as shown in FIG. 9, equivalent to a composite sealing material in which a first protrusion and a second protrusion come into contact with each other in a tapered pattern In order to evaluate a plasma resistance, two pieces having the same shape for each sample were prepared. A low tightening load was applied to one of them to evaluate a plasma resistance (on the assumption that a large diameter was sealed), and a high tightening load was applied to the other of them to evaluate a plasma resistance (on the assumption that a normal diameter was sealed).

b) Conventional sample [NK Ring (product name)]: NK Ring (product name) manufactured by NES, Ltd. in the United Kingdom is a sealing material in which a fluorocarbon rubber is completely covered by a jacket made of a fluorocarbon resin.

c) Fluorocarbon rubber O ring

2. Seal Performance Evaluation Method

Figure 13:
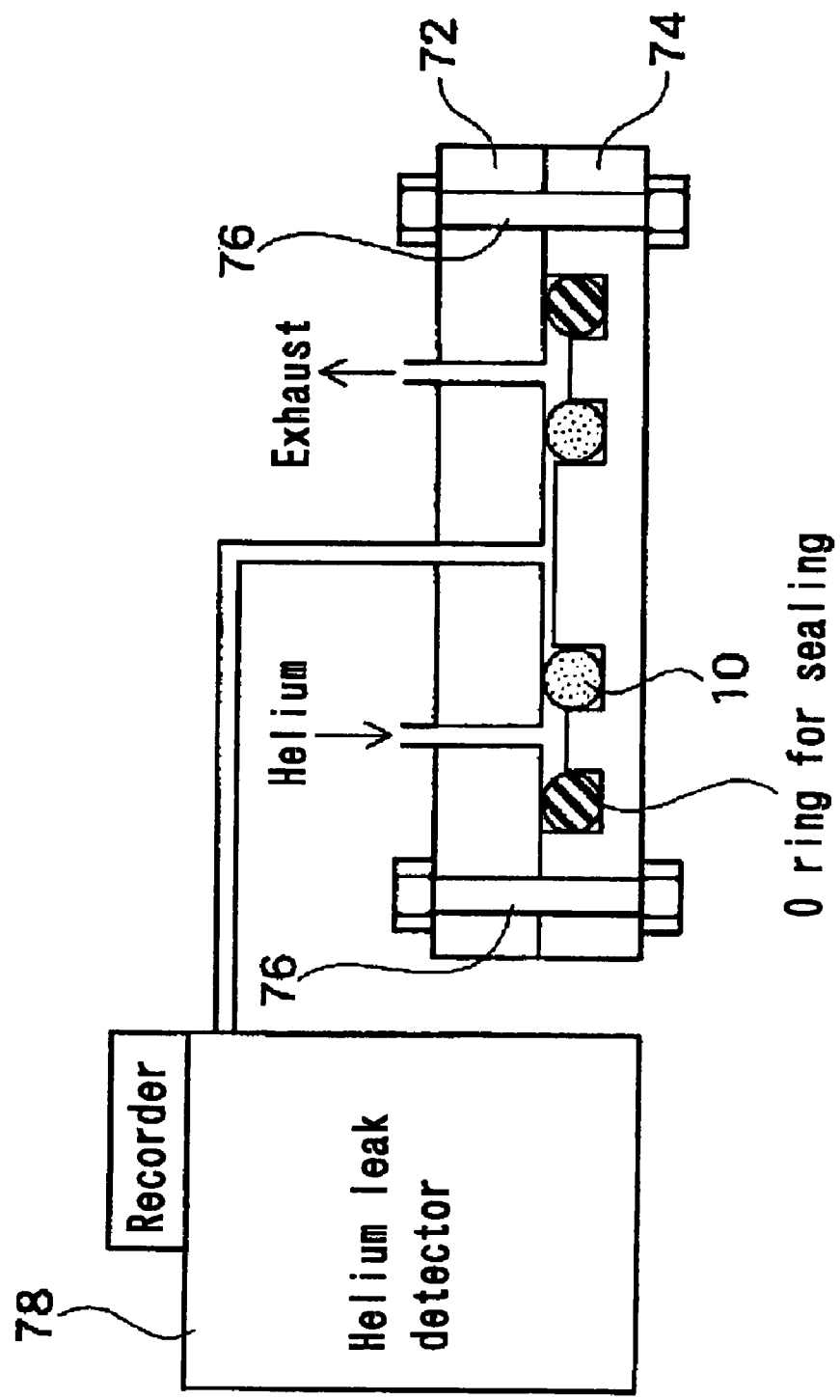
FIG. 13 is a schematic view showing a testing apparatus for researching a sealing performance of a sealing material related to an embodiment of the present invention.

As shown in FIG. 13, a sample 10 was tightened between flanges 72 and 74 at a tightening load of 86 kgf by using a torque wrench and was fixed by bolts 76. An inner diameter side of the sample 10 was then evacuated while measured by a helium leak detector 78, a helium gas was flown (10 ml/min) to the outer diameter side of the sample 10, and a permeation leaking amount of the sample 10 was measured. Subsequently, the same sample was tightened at a tightening load of 400 kgf, and a permeation leaking amount was measured similarly.

3. Plasma Resistance Evaluation Test Method

Figure 14:
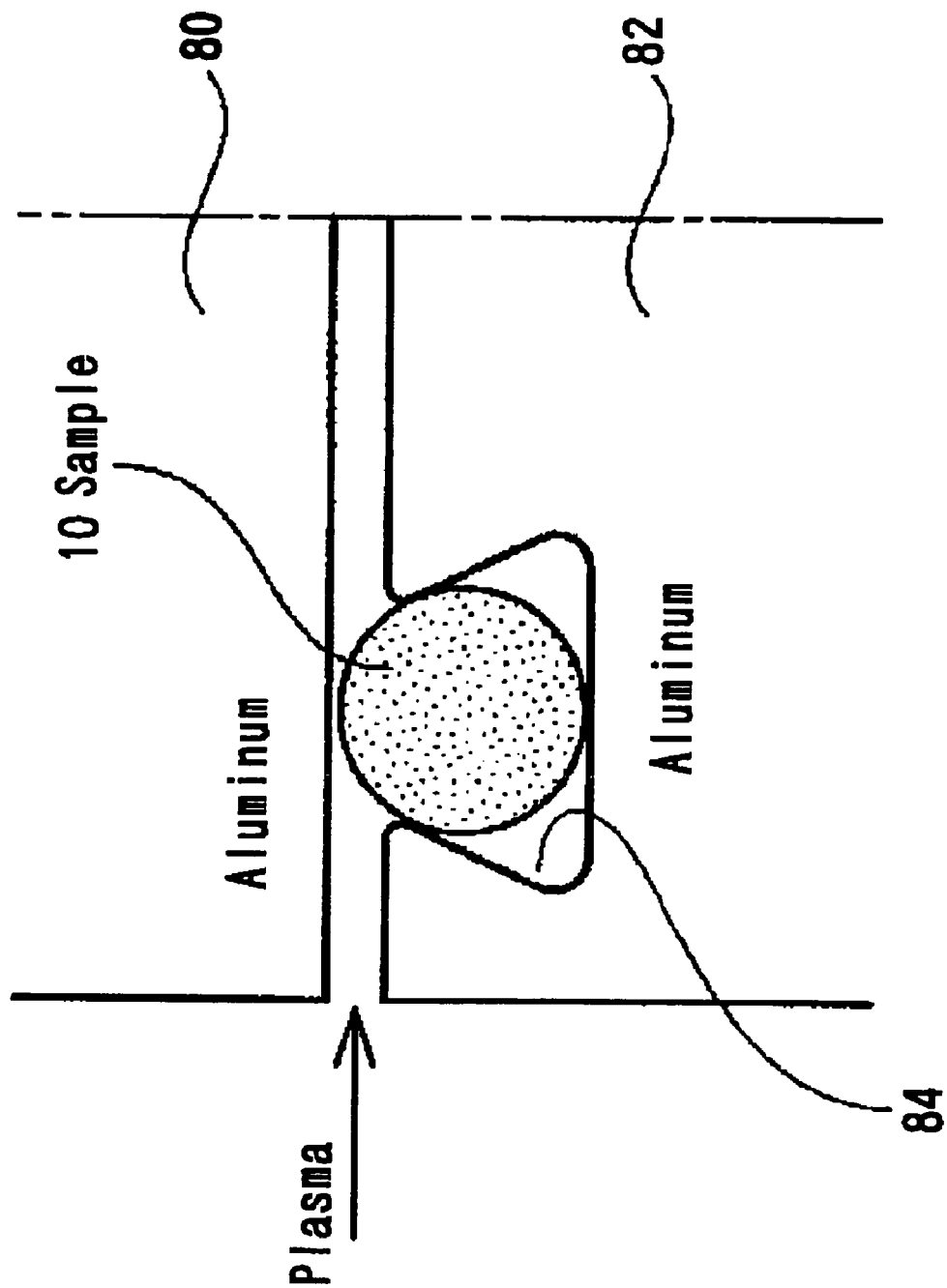
FIG. 14 is a schematic view showing a jig for evaluation that is used in the case in which a sample is disposed on a sealing apparatus.
Figure 15:
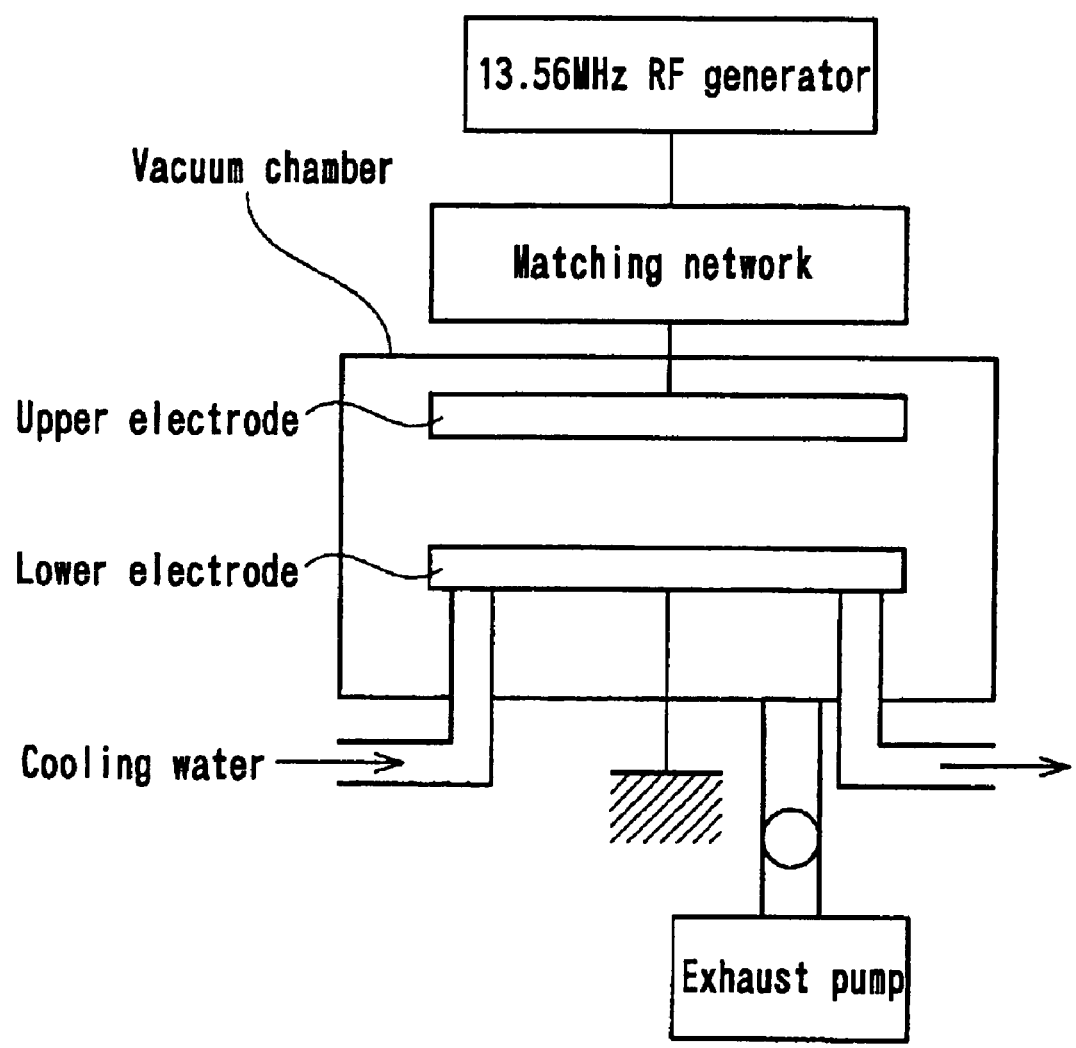
FIG. 15 is a schematic view showing a testing apparatus for researching a plasma resistance.
Figure 16:
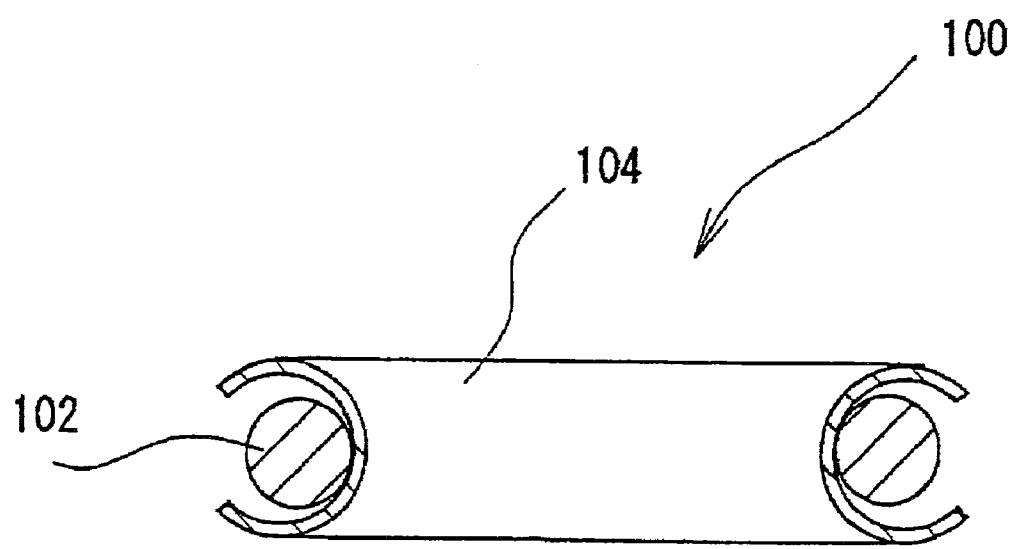
FIG. 16 is a cross-sectional view showing a conventional composite sealing material.
Figure 17:
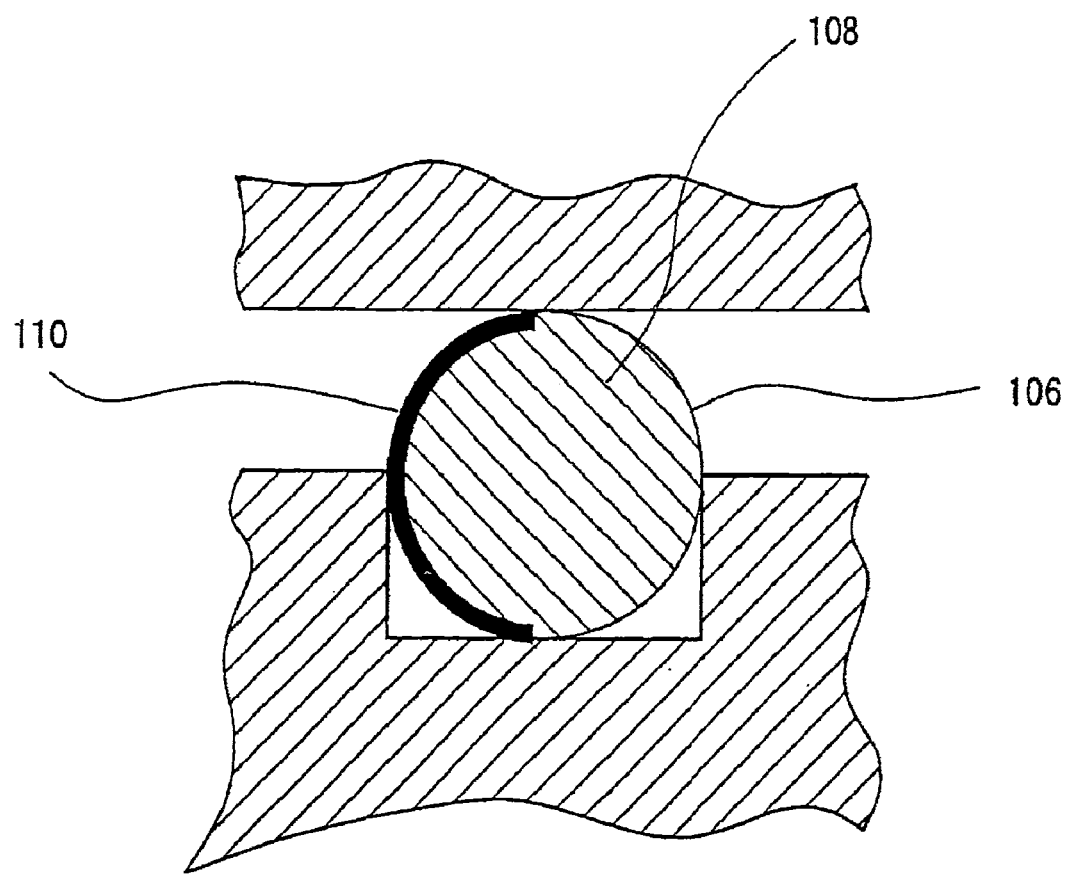
FIG. 17 is a cross-sectional view showing a conventional composite sealing material.
Figure 18:
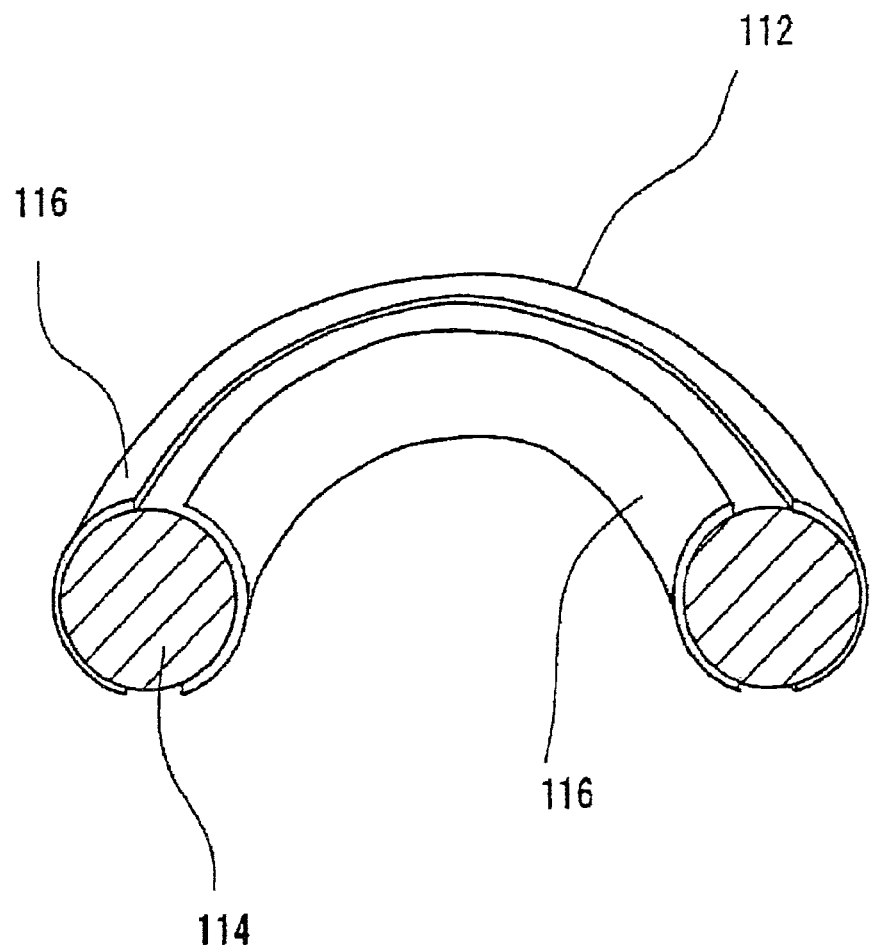
FIG. 18 is a partially expanded perspective view showing a conventional composite sealing material.
Figure 19:
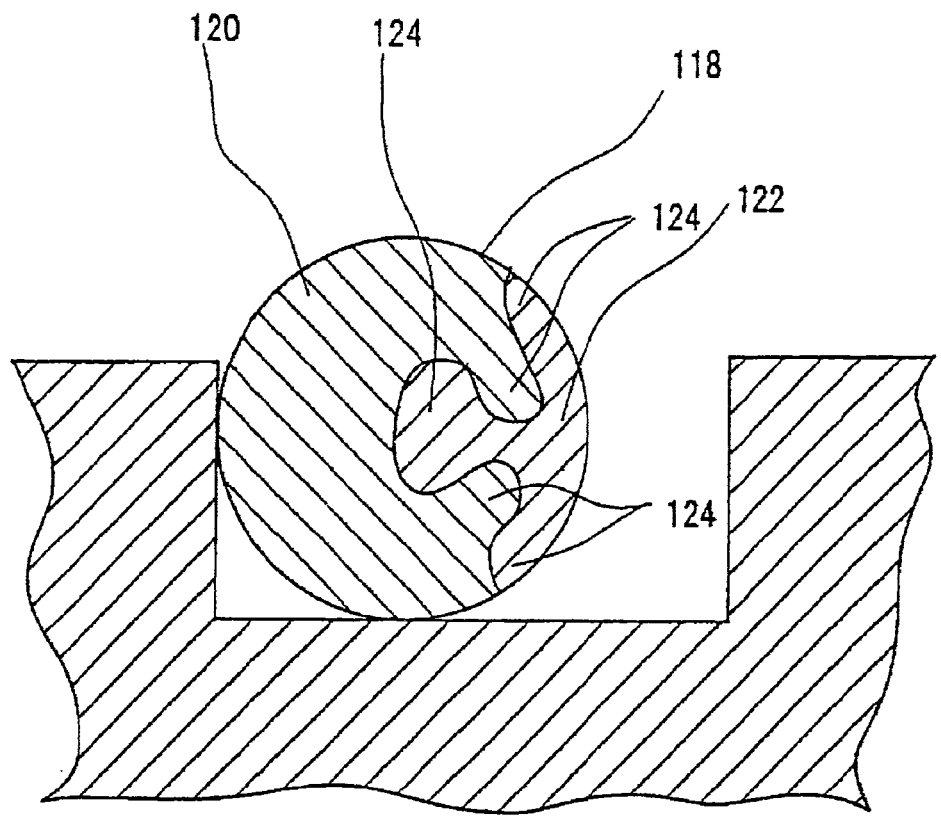
FIG. 19 is a cross-sectional view showing a conventional composite sealing material.
Figure 20:
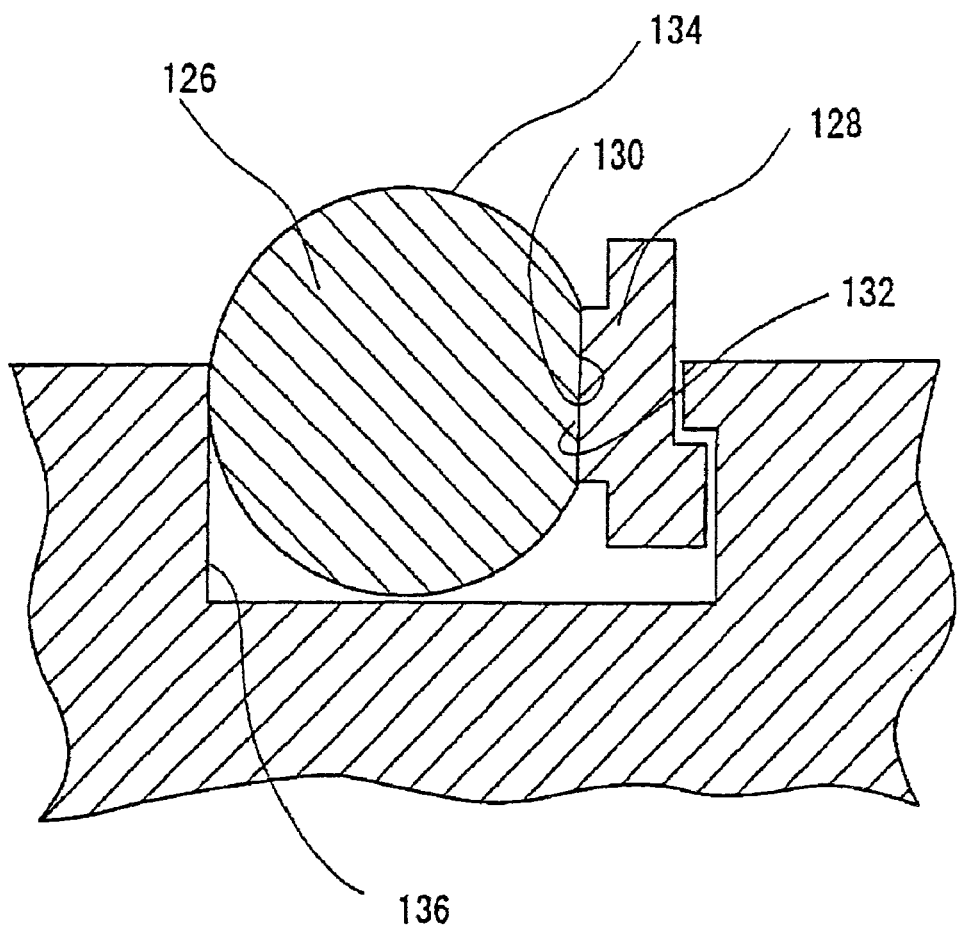
FIG. 20 is a cross-sectional view showing a conventional composite sealing material.

Separate plasma resistance evaluation tests were carried out under the conditions of a low tightening load and a high tightening load respectively. More specifically, as shown in FIG. 14, there was prepared a plasma evaluation jig made of aluminum and composed of an upper material 80 and a lower material 82 both in an almost disc shape in which a dove tail groove 84 for installing a sample was formed in the lower material 82. A sample 10 was then installed in the lower material 82 of the plasma evaluation jig, and the upper material 80 was fixed at a low tightening load (86 kgf) with a bolt by using a torque wrench. Subsequently, the evaluation jig in which the sample was installed was disposed on a lower electrode of a plasma CVD apparatus as shown in FIG. 15, and plasma was irradiated under the following conditions.

The other sample 10 was tightened at a high tightening load (400 kgf), and plasma was irradiated under the same conditions.

Plasma output power: 500 W
Irradiating time: three hours
Introduction gas: oxygen 180 sccm/$CF_4$ 20 sccm
Degree of vacuum: 0.6 Torr
Jig gap: 0.1 mm to 0.2 mm
Compression load:
  Normal compression load: 400 kgf
  Low compression load: 86 kgf Sample dimensions: AS568A-241

(This sample was installed in a circular sealing groove having a diameter T of 103.1 mm as shown in FIG. 9.)

Major Dimensions of a Sample Related to Embodiment 1
L1: 3.4 mm
L2: 3.34 mm
L3: 3.0 mm
L5: 2.6 mm
L7: 0.8 mm
L8: 2.1 mm
L9: 1.8 mm
L10: 1.8 mm
θ: 64°

Major Dimensions of a Sample Related to Embodiment 2
L1: 3.4 mm
L2: 3.34 mm
L3: 3.0 mm
L5: 2.6 mm
L6: 0.3 mm
L7: 1.0 mm
L8: 2.1 mm
L9: 1.8 mm
L10: 1.8 mm
θ: 64°

Test Temperature: Room Temperature

4. Test Results

The test results are shown in Table 1. A performance of each sample was evaluated by two marks of o and x. A value given in parentheses is a helium permeation amount, and its unit is $Pa \cdot m^3/s$.

In the sealing test, both Embodiments 1 and 2 showed a sealing performance equivalent to that of the fluorocarbon rubber O ring. This means that the samples related to the present invention can display sealing ability by the first sealing member 20 even in the shape of FIGS. 1 and 9 and even under the condition of a low tightening load.

However, in the plasma resistance test, for Embodiment 1 (a sample equivalent to the member shown in FIG. 1), although a plasma resistance was satisfactory at a normal compression load, it was impossible to display a plasma resistance at a low compression load.

Moreover, for Embodiment 2 (a sample equivalent to the member shown in FIG. 9), a plasma resistance was satisfactory both at a low tightening pressure and at a high tightening pressure. By this, it is thought that a formation of the tapered face 25 causes the first sealing member 20 to be sufficiently compressed and deformed, and causes a gap between the second sealing member 24 made of a PTFE resin and a matching member (the upper material 80 of the test jig) to be substantially eliminated, thereby enabling a plasma screening effect due to the second sealing member 24 to effectively function.

However, for the sample of Embodiment 1, in the case in which only a low compression load was applied, since a sufficient deformation for filling up a gap between the second sealing member 24 and the matching member was not carried out, plasma that penetrated into the gap between the second sealing member 24 and the matching member was thought to etch a plasma exposed face of the first sealing member 20. The fluorocarbon rubber O ring of the conventional sample was also etched similarly.

Consequently, in the case of Embodiment 2 shown in FIG. 9, it was confirmed that a seal performance and a plasma screening performance were displayed even in the case in which only a low compression load was applied to the sealing material as compared with Embodiment 1 shown in FIG. 1.

In the plasma resistance evaluation test, for the composite sealing material related to Embodiment 1 of the present invention and the NK Ring (product name) that was a conventional sample, it was confirmed that blocking was carried out by a resin portion resistant to plasma that was a corrosive fluid. The surface of the fluorocarbon rubber O ring was extremely etched by plasma.

Consequently, it was confirmed that the samples related to the present invention had both a seal performance and a function to prevent a corrosive fluid in both the cases of the shape shown in FIG. 1 and of the shape shown in FIG. 9.

TABLE 1

| Sample name | Seal performance (normal compression load: 400 kgf) | Seal performance (low compression lead: 86 kgf) | Plasma resistance (normal compression load: 400 kgf) | Plasma resistance (low compression load: 86 kgf) |
|---|---|---|---|---|
| Embodiment 1 | ◯ ($2 \times 10^{-8}$) | ◯ ($2 \times 10^{-8}$) | ◯ | X |
| Embodiment 2 | ◯ ($2 \times 10^{-8}$) | ◯ ($2 \times 10^{-8}$) | ◯ | ◯ |

TABLE 1-continued

| Sample name | Seal performance (normal compression load: 400 kgf) | Seal performance (low compression lead: 86 kgf) | Plasma resistance (normal compression load: 400 kgf) | Plasma resistance (low compression load: 86 kgf) |
|---|---|---|---|---|
| Conventional sample [NK Ring (product name)] | X ($2 \times 10^{-5}$) | X ($2 \times 10^{-5}$) | ○ | ○ |
| Fluorocarbon rubber ○ ring | ○ ($1 \times 10^{-8}$) | ○ ($1 \times 10^{-8}$) | X | X |

While the preferred embodiments of the present invention have been described above, the present invention is not restricted to the embodiments, and various changes and modifications can be thus made without departing from the scope of the present invention. For instance, while the above embodiment describes the case in which the present invention is applied to a semiconductor manufacturing apparatus such as a dry etching apparatus and a plasma CVD apparatus, the composite sealing material related to the present invention can also be used for sealing sections of other apparatuses used under the severe conditions of other environments.

The invention claimed is:

1. A composite sealing material to be installed in a sealing groove, comprising:
a first sealing member, which is located on one side wall side of the sealing groove in the case in which the composite sealing material is installed in the sealing groove, and
a second sealing member, which is located on the other side wall side of the sealing groove in the case in which the composite sealing material is installed in the sealing groove,
wherein the first sealing member is made of an elastic member,
the second sealing member is made of a synthetic resin material that is harder than the first sealing member,
the first sealing member is provided with a first sealing member body and a first sealing portion provided with a swelled portion swelling externally from an opening portion of the sealing groove, the swelled portion of the first sealing portion of the first sealing member swelling in a curved face shape to the opening portion side of the sealing groove,
the second sealing member is provided with a second sealing member body and a second sealing portion located on the opening portion side of the sealing groove as compared with the second sealing member body,
the second sealing portion of the second sealing member is provided with a second extended portion extending to the first sealing member side,
the first sealing member body is provided with a first extended portion extending to the bottom portion side of a sealing groove side of the second extended portion of the second sealing member, the bottom face on the sealing groove side of the first sealing member body defines a planar surface, the planar surface is configured to contact a bottom portion side of the sealing groove,
in the case in which the composite sealing material is press-fitted, the swelled portion of the first sealing portion of the first sealing member is press-fitted to impart sealing ability, and
the second extended portion of the second sealing member is pressed to the opening portion side of the sealing groove through the first extended portion of the first sealing member, and an upper face edge portion of the second sealing portion is press-fitted to impart sealing ability.

2. The composite sealing material as defined in claim 1, wherein the first extended portion of the first sealing member and the second extended portion of the second sealing member come into contact with each other at a flat face almost parallel to the bottom portion of the sealing groove.

3. The composite sealing material as defined in claim 1, wherein the first extended portion of the first sealing member and the second extended portion of the second sealing member come into contact with each other at a tapered face in which a diameter becomes smaller as it is closer to the bottom portion of the sealing groove.

4. The composite sealing material as defined in claim 1, wherein the second sealing member body is provided with a bottom extended portion extending to the first sealing member side at the bottom portion side of the sealing groove.

5. The composite sealing material as defined in claim 1, wherein an edge face of the first sealing member body on one side wall side of the sealing groove is a tapered face in which a diameter becomes smaller as it is closer to the bottom portion of the sealing groove.

6. The composite sealing material as defined in claim 1, wherein the sealing groove is a dove tail groove in which a width of the bottom portion side of the sealing groove is larger than a width of the opening portion side of the sealing groove.

7. The composite sealing material as defined in claim 1, wherein the sealing groove has a cross section in an almost rectangular shape in which a width of the bottom portion side of the sealing groove and a width of the opening portion side of the sealing groove are almost equivalent to each other.

8. The composite sealing material as defined in claim 1, wherein the first sealing member is made of a rubber.

9. The composite sealing material as defined in claim 8, wherein the rubber forming the first sealing member is a fluorocarbon rubber.

10. The composite sealing material as defined in claim 1, wherein a synthetic resin forming the second sealing member is made of at least one kind of synthetic resin selected from a fluorocarbon resin, a polyimide resin, a polyamideimide resin, a polyetherimide resin, a polyphenylene sulfide resin, a polybenzimidazole resin, and a polyether ketone resin.

11. The composite sealing material as defined in claim 1, wherein a seal height L3 of the first sealing member and a seal height L5 of the second sealing member are set in such a manner that a squeeze ratio of L3 is equivalent to or larger than a squeeze ratio of L5, wherein a squeeze ratio is calculated by the expression of (seal height−groove depth L4)/seal height×100.

12. A sealing apparatus, wherein the composite sealing material as defined in claim 1 is installed in a sealing groove.

* * * * *